(12) United States Patent
Caspi

(10) Patent No.: US 12,739,124 B1
(45) Date of Patent: Sep. 15, 2026

(54) CONTEXTUAL PRIVACY FINGERPRINTING ENGINE (CPFE)

(71) Applicant: Eitan Caspi, Kfar-Yona (IL)

(72) Inventor: Eitan Caspi, Kfar-Yona (IL)

( * ) Notice: Subject to any disclaimer, the term of this patent is extended or adjusted under 35 U.S.C. 154(b) by 0 days.

(21) Appl. No.: 19/537,814

(22) Filed: Feb. 12, 2026

(51) Int. Cl.
*H04L 9/32* (2006.01)
*G06F 21/16* (2013.01)

(52) U.S. Cl.
CPC ............ *H04L 9/3213* (2013.01); *G06F 21/16* (2013.01)

(58) Field of Classification Search
CPC .......... H04L 9/00; H04W 12/00; H04W 12/02
See application file for complete search history.

(56) References Cited

U.S. PATENT DOCUMENTS 9,280,684 B1 * 3/2016 Kragh ................. G06F 21/6227
11,790,111 B2 * 10/2023 Wang ........................ H04L 9/30 713/193
11,888,981 B2 * 1/2024 Androulaki ............. H04L 9/088
2015/0101007 A1 * 4/2015 Fujioka ................. H04L 63/107 726/1
2021/0342759 A1 * 11/2021 Beaumont .......... G06Q 10/0635
2022/0083934 A1 * 3/2022 Brannon .............. G06Q 10/067
2022/0179979 A1 * 6/2022 Goswami ............ G06F 11/1451
2022/0309416 A1 * 9/2022 Barday ................ G06Q 10/067
2022/0358240 A1 * 11/2022 Neal ................... G06F 21/6245
2025/0323663 A1 * 10/2025 Li ....................... H03M 7/3059
2026/0050745 A1 * 2/2026 Galvin .................... G06F 12/08
2026/0073334 A1 * 3/2026 Maheshkar ........ G06Q 10/0635
2026/0080099 A1 * 3/2026 Bhavani Sankar .......................... G06F 21/6254

* cited by examiner

*Primary Examiner* — Khang Do

(57) ABSTRACT

There is provided a method comprising: extracting candidate contextual metadata associated with a data processing event, filtering the candidate contextual metadata to reject fields matching patterns correlated with identifiable data, for generating contextual metadata excluding data identifiable with at least one specific identity, dynamically computing a regulatory anchor set for the data processing event based on the contextual metadata, the regulatory anchor set comprising state anchors indicating a dynamic state computed based on current operation and/or current context, feeding the regulatory anchor set into a deterministic reasoning engine configured for verification of the privacy policy by applying jurisdictional rules, computing, by the reasoning engine, a verification indication and an explanation trace without using data identifiable with at least one specific identity, and generating a non-identifiable verification token (NICT) including the verification indication and the explanation trace, wherein the NICT excludes data identifiable with at least one specific identity.

22 Claims, 18 Drawing Sheets

| anchor_type_id | name | description | default_risk_level |
| --- | --- | --- | --- |
| AT_MARKETING_EMAIL | Marketing Email | Outbound promotional email campaigns | MEDIUM |
| AT_FRAUD_DETECTION | Fraud Detection | Fraud detection and investigation flows | HIGH |
| AT_HR_PAYROLL | HR Payroll | Employee payroll and reconciliation | HIGH |

400

| Field | Example Value |
| --- | --- |
| anchor_id | ANC_MARKETING_NEWSLETTER_EU_V1 |
| anchor_type_id | AT_MARKETING_EMAIL |

| Field | Example Value |
| --- | --- |
| version | 1 |
| status | ACTIVE |
| **Legal Dimension** | |
| jurisdiction | EU_DE |
| requires_consent | true |
| candidate_legal_bases | ["CONSENT"] |
| default_legal_basis | "CONSENT" |
| retention_policy_code | "RET_MARKETING_24M" |
| regulatory_modifiers | ["NO_CHILDREN_UNDER_16"] |
| **Contextual Dimension** | |
| purpose_code | "MARKETING_NEWSLETTER" |
| data_categories | ["CONTACT_DATA","BEHAVIORAL_EVENT"] |
| processing_actions | ["SEND_EMAIL"] |
| system_scope | ["crm_marketing"] |
| **Risk & Technical** | |
| base_risk_score | 0.4 |
| risk_factors | ["TRACKING","BEHAVIORAL_ANALYTICS"] |

| Field | Example Value |
| --- | --- |
| risk_modifiers | ["IF ADVERTISING_PARTNERS_USED THEN risk+=0.2"] |
| technical_constraints | ["INCLUDE_UNSUBSCRIBE_LINK","RESPECT_OPT_OUT_FLAGS"] |
| **Meta** | |
| created_by | "privacy_officer_1" |
| created_at | 2025-11-18T10:20:00Z |
| updated_at | 2025-11-18T10:20:00Z |

500

| Field | Example Value |
|---|---|
| anchor_id | "ANC_FRAUD_CROSS_PLATFORM_EU_V1" |
| anchor_type_id | "AT_FRAUD_DETECTION" |
| version | 1 |
| status | "ACTIVE" |
| **Legal Dimension** | |
| jurisdiction | "EU_IE" |
| requires_consent | false |
| candidate_legal_bases | ["LEGAL_OBLIGATION","LEGITIMATE_INTEREST"] |

| Field | Example Value |
|---|---|
| default_legal_basis | "LEGAL_OBLIGATION" |
| retention_policy_code | "RET_FRAUD_72M" |
| regulatory_modifiers | ["SECURITY_EXCEPTION","POTENTIAL_SPECIAL_CATEGORY"] |
| **Contextual Dimension** | |
| purpose_code | "FRAUD_INVESTIGATION" |
| data_categories | ["TRANSACTIONAL_DATA","BEHAVIORAL_EVENT","ACCOUNT_EVENT"] |
| processing_actions | ["FRAUD_ANALYSIS","RISK_SCORING"] |
| system_scope | ["fraud_engine","payment_gateway","crm_core"] |
| **Risk & Technical** | |
| base_risk_score | 0.7 |
| risk_factors | ["CROSS_PLATFORM_ANALYSIS","FINANCIAL_DATA","BEHAVIORAL_PROFILING"] |
| risk_modifiers | ["IF AI_MODEL_USED THEN REQUIRE_DPIA","IF EXPORT_OUTSIDE_EU THEN SCC"] |
| technical_constraints | ["STRICT_ACCESS_CONTROL","FULL_AUDIT_LOG","NO_THIRD_PARTY_EXPORT"] |
| **Meta** | |

FIG. 6ii

| Field | Example Value |
| --- | --- |
| created_by | "legal_risk_team_1" |
| created_at | 2025-11-18T10:25:00Z |
| updated_at | 2025-11-18T10:25:00Z |
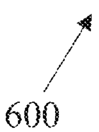
600
FIG. 6iii

| mapping_id | tenant_id | source_system | event_type | jurisdiction_pattern | purpose_code_pattern | data_category_pattern | anchor_id | priority | status |
|---|---|---|---|---|---|---|---|---|---|
| MAP_MARKET_EU_EMAIL_01 | tenant_123 | crm_marketing | SEND_EMAIL | "EU_*" | "MARKETING_NEWSLETTER" | ["CONTACT_DATA","BEHAVIORAL_EVENT"] | ANC_MARKETING_NEWSLETTER_EU_V1 | 10 | ACTIVE |

| mapping_id | tenant_id | source_system | event_type | jurisdiction_pattern | purpose_code_pattern | data_category_pattern | anchor_id | priority | status |
|---|---|---|---|---|---|---|---|---|---|
| MAP_FRAUD_EU_MULTI_01 | tenant_123 | fraud_engine | FRAUD_ANALYSIS | "EU_*" | "FRAUD_*" | ["TRANSACTIONAL_DATA","BEHAVIORAL_EVENT"] | ANC_FRAUD_CROSS_PLATFORM_EU_V1 | 20 | ACTIVE |

FIG. 7

FIG. 8 FIG. 8iii FIG. 8vi
FIG. 8i FIG. 8iv FIG. 8vii
FIG. 8ii FIG. 8v FIG. 8viii

| Anchor name 802 | Anchor description 804 | Variables (with possible values) 806 | Variable descriptions (concise) | Purpose & advantage vs metadata & competitors |
|---|---|---|---|---|
| **#1 PURPOSE (Multi-Signal Computed Purpose)** | Computes a **purpose probability vector** and a normative purpose band for an event using multi-signal context (no PII). Supports **purpose drift** detection. | **x_purpose[K]** — probability distribution — each ∈[0,1], Σ=1; K≈6 (e.g., Marketing/Sales/HR/Support/Compliance/Unknown) **purpose_band** — selected band — {MARKETING, SALES, HR, SUPPORT, COMPLIANCE, UNKNOWN} **conf** — confidence — [0,1] **drift** — drift measure — ≥0 (e.g., KL divergence) **top_contributors** — explainability features — list of {feature, weight} **quality_flags** — data quality gates — set of codes (e.g., SCHEMA_OK, SIGNALS_OK, LOW_CONF) | x_purpose: model output distribution purpose_band: chosen canonical purpose class conf: strength of evidence given signals quality drift: change vs baseline window (function creep) top_contributors: "why" evidence without PII quality_flags: whether payload is valid/complete | **Metadata**: `purpose=marketing` is static and spoofable (table-name based). **Anchor**: purpose is computed from operation/channel/transfer/time patterns; produces drift + trace that competitors' static labeling often lacks. |
| **#2 OPERATION (Multi-Signal** | Normalizes heterogeneous actions to a | **x_op[M]** — op distribution — each ∈[0,1], Σ=1; | x_op/op_code: what actually happened | **Metadata**: "endpoint name implies export" |

| Anchor name 802 | Anchor description 804 | Variables (with possible values) 806 | Variable descriptions (concise) | Purpose & advantage vs metadata & competitors |
|---|---|---|---|---|
| **Computed Operation)** | **canonical operation code** (event semantics), independent of system-specific field names. | M≈5–8 **op_code** — canonical operation — {READ, QUERY, WRITE, UPDATE, DELETE, EXPORT, SHARE, SYNC} **conf** — [0,1] **drift** — ≥0 **evidence_flags** — {NORMAL, DEGRADED, AUDIT} | (semantic action) conf/drift: robustness and deviation from norm evidence_flags: whether to escalate evidence collection | is brittle. **Anchor**: canonicalizes action from telemetry/flow/ direction/volume—enabling stable policy rules across CRM/DB/SaaS. |
| **#3 SENSITIVITY** | Computes **event sensitivity score** and sensitivity band from category exposure + volume escalation (no content). | **sensitivity_score** — [0,1] **sensitivity_band** — {LOW, MEDIUM, HIGH, SPECIAL} **CEM** (category exposure multiplier) — ≥1 **VEE** (volume escalation effect) — typically [1,2] **conf** — [0,1] | sensitivity_score: normalized risk from category mix + scale CEM/VEE: interpretable sub-metrics (why sensitivity high) band: thresholds for rule selection conf: confidence given system profiling completeness | **Metadata**: manual "PII label" is coarse. **Anchor**: produces continuous score + interpretable components (CEM/VEE) enabling deterministic rules (e.g., escalate safeguards) and conservative behavior when confidence is low. |
| **#4 TRANSFER_BOUNDARY** | Determines whether the event crosses **internal boundary, third-** | **boundary_vector[B]** — distribution, Σ=1 **boundary_band** — {INTERNAL, | boundary_*: what boundary is crossed third_party/cross_border: | **Metadata**: "destination tag" is often absent or wrong. **Anchor**: |

| Anchor name 802 | Anchor description 804 | Variables (with possible values) 806 | Variable descriptions (concise) | Purpose & advantage vs metadata & competitors |
|---|---|---|---|---|
| | **party**, and/or **cross-border**, including destination class. | INTERNAL_ETL, TO_THIRD_PARTY, CROSS_BORDER, UNKNOWN} **third_party** — {true/false} **cross_border** — {true/false} **TPAS** (third-party probability) — [0,1] **CBC** (cross-border confidence) — [0,1] **sink_class** — {INTERNAL_SERVICE, EMAIL_GATEWAY, EXTERNAL_API, VENDOR_SAAS, FILE_EXPORT, UNKNOWN} **vendor_class** — {KNOWN_VENDOR, UNKNOWN_VENDOR, INTERNAL} **geo_out** — {EU, US, IL, OTHER, UNK} **conf** — [0,1] | booleans used by rules TPAS/CBC: confidence measures sink/vendor/geo: explainable destination context | computes boundary states from observed sinks/flows; supports transfer restrictions + required mechanisms (e.g., SCC/DPAs) that competitors often implement only as workflow/manual checks. |
| **#5 JURISDICTION** | Resolves applicable **jurisdiction(s)** for event | **jur_vector[J]** — Σ=1 **primary_jur** — {EU, US, IL, | primary/secondary: what rule packs apply locus/geo: | **Metadata**: static "GDPR applies" is not event-specific. **Anchor**: |

| Anchor name 802 | Anchor description 804 | Variables (with possible values) 806 | Variable descriptions (concise) | Purpose & advantage vs metadata & competitors |
|---|---|---|---|---|
| | evaluation (primary + secondary). | OTHER, UNK} **secondary_jur[]** — list of above **controller_locus** — {EU, US, IL, OTHER, UNK} **subject_locus** — {EU, US, IL, OTHER, UNK} **geo_in / geo_out** — {EU, US, IL, OTHER, UNK} **conf** — [0,1] **quality_flags** — set | inputs to conflict/prevalence conf/flags: evidence sufficiency | computes applicability per event (origin, destination, subject/controller loci), enabling multi-regime deterministic evaluation. |
| **#6 LAWFUL_BASIS / CONSENT_STATE** | Computes lawful-basis candidates and consent validity state for the event (deterministic boundary). | **lawful_basis** — statute-coded enum (e.g., GDPR_6_1_A, GDPR_6_1_B, LI, CONTRACT ...) **consent_state** — {VALID, EXPIRED, MISSING, WITHDRAWN, NOT_REQUIRED, UNKNOWN} **constraints[]** — list of control codes (e.g., REQUIRE_RECONSENT, LIMIT_DESTINATION) **conf** — [0,1] | lawful_basis: active basis selected by rules consent_state: scoped/time-based status constraints: what must be enforced if conditional conf: certainty | **Metadata**: "consent=true" without scope/expiry is unsafe. **Anchor**: deterministic selection + explicit constraints, suitable for allow/block/conditional decisions without processing PII content. |

| Anchor name 802 | Anchor description 804 | Variables (with possible values) 806 | Variable descriptions (concise) | Purpose & advantage vs metadata & competitors |
|---|---|---|---|---|
| **#7 RETENTION / EXPIRATION** | Computes retention TTL, age class, and whether retention is expired at evaluation time. | **allowed_ttl_days** — integer ≥0 **age_days** — integer ≥0 **expired** — {true/false} **retention_band** — {ACTIVE, NEAR_EXPIRY, EXPIRED, UNKNOWN} **dataset_age_class** — {NEW, MID, OLD} **deletion_capability_class** — {SUPPORTED, NOT_SUPPORTED, UNKNOWN} **conf** — [0,1] **quality_flags** — set | TTL/age/expired: core retention legality inputs bands/classes: normalized outputs for rules/UX deletion_capability: determines remediation action | **Metadata**: "retention=180d" is not runtime enforcement. **Anchor**: computes expired/near-expiry per event; supports blocking/conditional processing and evidence trace. |
| **#8 RISK / SAFEGUARDS** | Produces risk score/band and required safeguards set (mitigation-aware decisioning). | **risk_score** — [0,1] **risk_band** — {LOW, MEDIUM, HIGH, CRITICAL} **safeguards_required[]** — controls (e.g., ENC_AT_REST, DLP, VENDOR_DPA) **safeguards_missing[]** — controls **conf** — [0,1] **trace** — fired factors list | risk_score/band: deterministic thresholds required/missing: basis for conditional allow trace: explainability | **Metadata**: "risk tag" is generic. **Anchor**: computes risk from other anchors + live safeguards; produces explicit mitigation set (conditions) that competitors often require manual GRC workflow to enforce. |

| Anchor name 802 | Anchor description 804 | Variables (with possible values) 806 | Variable descriptions (concise) | Purpose & advantage vs metadata & competitors |
|---|---|---|---|---|
| **#9 BEHAVIORAL PATTERN / ANOMALY** | Detects anomalous patterns using aggregate telemetry: rate, burst, sequence, temporal coherence. | **rate_score** — [0,1] **burst_score** — [0,1] **sequence_score** — [0,1] **temporal_coherence** — [0,1] **anomaly_score** — [0,1] **anomaly_band** — {NORMAL, SUSPICIOUS, ANOMALOUS} **conf** — [0,1] | Component scores: interpretable anomaly drivers anomaly_score/band: enforcement triggers conf: baseline sufficiency | **Metadata**: cannot express behavior. **Anchor**: catches scraping/mass export/drift without PII; supports adaptive monitoring and risk escalation. |
| **#10 CONVERGENCE CONFIDENCE** | Clusters related events across systems into a common processing context using similarity + confidence. | **ASS** — anchor similarity score — [0,1] **TAS** — temporal alignment score — [0,1] **CSRC** — cross-system reliability coefficient — {0, 0.5, 1} **confidence** — [0,1] **conv_band** — {LOW, MEDIUM, HIGH} **cluster_id** — opaque id | ASS/TAS/CSRC: interpretable components confidence/band: whether to converge cluster_id: non-identifying linkage for process context | **Metadata**: asset-centric lineage ≠ process/legal convergence. **Anchor**: enables "user-less convergence" and process-level determinations while still issuing **NICT per event**. |
| **#11 LEGAL EXPLANATION / DECISION TRACE** | Produces deterministic decision trace (allow/conditional/review/block) + rule-path | **decision** — {ALLOW, CONDITIONAL, REVIEW, BLOCK} **legal_basis_refs []** — statute refs | decision: the deterministic result violations/conditions: machine-actionable | **Metadata tools** produce reports; they often do not create a deterministic per-event legal |

| Anchor name 802 | Anchor description 804 | Variables (with possible values) 806 | Variable descriptions (concise) | Purpose & advantage vs metadata & competitors |
|---|---|---|---|---|
| | explanation objects. | **violations[]** — statute refs **conditions[]** — control codes **explanation_trace[]** — ordered rule path **policy_refs[]** — policy-pack refs | outcomes trace: explainability for audit & product UX | trace object. This anchor creates an auditable decision boundary without LLM dependency. |
| **#12 PROVENANCE / EVIDENCE CHAIN** | Captures provenance (policy pack/version, anchor snapshots, trace hash chain) for audit without storing PII. | **policy_pack_id** — string **policy_version** — string/semver **anchor_outputs_hash** — digest **rule_trace_hash** — digest **evidence_chain_hash** — digest **audit_mode** — {NORMAL, AUDIT, DEGRADED} **anchor_snapshot_ref** — opaque reference | pack/version: reproducibility hashes: tamper-evidence audit_mode: verbosity/retention profile | Competitors often store logs with identifiers. Here, provenance is non-identifying and cryptographically bound to the decision, enabling audits with minimal exposure. |
| **#13 TECHNICAL CONTEXT / EXECUTION ENVIRONMENT** | Encodes execution context (direction, integration, environment) used as rule modifiers. | **execution_mode** — {API_CALL, BATCH_JOB, EXPORT_JOB, SYNC_TASK, ETL_PIPELINE} **data_flow_direction** — {INBOUND, OUTBOUND, INTERNAL} **system_role** — {SOURCE, | These variables disambiguate identical operations under different technical risk conditions (e.g., OUTBOUND FILE_EXPORT in PROD) | Metadata labeling ignores runtime environment/direction. This anchor makes rules technically aware without PII (e.g., stricter rules for OUTBOUND+FIL |

800

FIG. 8viii

| Anchor name 802 | Anchor description 804 | Variables (with possible values) 806 | Variable descriptions (concise) | Purpose & advantage vs metadata & competitors |
|---|---|---|---|---|
| | | PROCESSOR, SINK} **integration_type** — {NATIVE, CUSTOM_API, SAAS, FILE_EXPORT} **environment_type** — {PROD, STAGE, DEV} **context_weight** — [0,1] | | E_EXPORT+PROD). |
| **#14 ADAPTIVE MONITORING & FEEDBACK STATE** | Implements closed-loop monitoring: adjusts sampling/window/evidence level and optional anchors based on risk/anomaly/convergence. | **monitoring_mode** — {NORMAL, ELEVATED, AUDIT} **sampling_rate** — [0,1] **time_window_min** — integer ≥1 **enabled_optional_anchors[]** — set (e.g., SAFEGAURDS_EXT, VOLUME_EXT, EVIDENCE_EXT) **evidence_level** — {MINIMAL, STANDARD, EXTENDED} **mode_reason_codes[]** — set | Allows dynamic overhead control while increasing evidence during suspicious conditions | Competitors typically scan periodically or require manual tuning. This anchor formalizes adaptive monitoring states as a deterministic FSM, tied to non-PII signals and audit needs. |

CONTEXTUAL PRIVACY FINGERPRINTING ENGINE (CPFE)

BACKGROUND

The present invention, in some embodiments thereof, relates to data privacy and, more specifically, but not exclusively, to systems and methods for validation of data privacy during processing of private data.

Entities that process data of users are required to comply with privacy laws.

SUMMARY

According to a first aspect, a computer implemented method of automated verification of a privacy policy, comprises: monitoring a data processing system for a data processing event, extracting candidate contextual metadata associated with the data processing event, filtering the candidate contextual metadata to reject fields matching patterns correlated with identifiable data, including: email address, phone number, name, device identifier, cookies, pseudonym, network addresses, and hashed identifiers, for generating contextual metadata excluding data identifiable with at least one specific identity, dynamically computing, by at least one of a connector executing within the data processing system and a server, a regulatory anchor set for the data processing event based on the contextual metadata, the regulatory anchor set comprising a plurality of state anchors indicating a dynamic state computed based on current operation and/or current context, feeding the regulatory anchor set into a deterministic reasoning engine configured for verification of the privacy policy by applying jurisdictional rules, computing, by the reasoning engine, a verification indication and an explanation trace without using data identifiable with at least one specific identity, and generating a non-identifiable verification token (NICT) including the verification indication and the explanation trace, wherein the NICT excludes data identifiable with at least one specific identity.

According to a second aspect, a system for automated verification of a privacy policy, comprises: a plurality of connectors, each connector configured for installation in a data processing system of a plurality of data processing systems and for monitoring the data processing system for a data processing event, extracting non-identifying contextual metadata associated with the data processing event, extracting contextual metadata associated with the data processing event, wherein the contextual metadata excludes data identifiable with at least one specific identity, processing the contextual metadata against a predefined schema to reject fields matching patterns correlated with identifiable data, including: email address, phone number, name, device identifier, cookies, pseudonym, network addresses, and hashed identifiers, and transmitting the contextual metadata over a network to a server, at least one processor of the server in network communication with the plurality of connectors, the at least one processor executing a code for: dynamically computing a regulatory anchor set for the data processing event based on the contextual metadata, the regulatory anchor set comprising a plurality of state anchors indicating a dynamic state computed based on current operation and/or current context, feeding the regulatory anchor set into a deterministic reasoning engine configured for verification of the privacy policy by applying jurisdictional rules, computing a verification indication and an explanation trace by the reasoning engine without using data identifiable with at least one specific identity, and generating a non-identifiable verification token (NICT) including the verification indication and the explanation trace, wherein the NICT excludes data identifiable with at least one specific identity, and in response to the NICT indicating a breach of the privacy policy, transmitting to the data processing system instructions for blocking execution of the data processing event.

According to a third aspect, a non-transitory medium storing program instructions for automated verification of a privacy policy, which when executed by at least one processor, cause the at least one processor to: extract candidate contextual metadata associated with the data processing event, filter the candidate contextual metadata to reject fields matching patterns correlated with identifiable data, including: email address, phone number, name, device identifier, cookies, pseudonym, network addresses, and hashed identifiers, for generating contextual metadata excluding data identifiable with at least one specific identity, dynamically compute, by at least one of a connector executing within the data processing system and a server, a regulatory anchor set for the data processing event based on the contextual metadata, the regulatory anchor set comprising a plurality of state anchors indicating a dynamic state computed based on current operation and/or current context, feed the regulatory anchor set into a deterministic reasoning engine configured for verification of the privacy policy by applying jurisdictional rules, compute, by the reasoning engine, a verification indication and an explanation trace without using data identifiable with at least one specific identity, and generate a non-identifiable verification token (NICT) including the verification indication and the explanation trace, wherein the NICT excludes data identifiable with at least one specific identity.

In a further implementation form of the first, second, and third aspects, further comprising, in response to the NICT indicating a breach of the privacy policy, transmitting to the data processing system instructions for blocking execution of the data processing event.

In a further implementation form of the first, second, and third aspects, further comprising, in response to the NICT indicating conditional execution, transmitting to the data processing system instructions for temporarily pausing execution of the data processing event, and ensuring implementations of specific safeguards encoded in the NICDT before resuming execution of the data processing event.

In a further implementation form of the first, second, and third aspects, a plurality of NICT tokens are computed for a plurality of data processing events, and further comprising: storing the plurality of NICT tokens in a database, and providing an interface for executing a query on the plurality of NICT tokens, wherein the query is selected from: identifying NCTs where consent state is expired and operation is export, identifying NCTs where retention has expired but processing continued, aggregating NCTs by risk score exceeding a threshold, identifying convergence clusters spanning multiple systems, and identifying NCTs where required safeguards are missing.

In a further implementation form of the first, second, and third aspects, the regulatory anchor set and/or NICT are non-identifying of a specific personal identity, not derived from attributes of the specific personal identify, non-reversible for identification of the specific personal identity, and cannot be used to reconstruct personal data, identity information, and/or person-related entities.

In a further implementation form of the first, second, and third aspects, further comprising: detecting, by a convergence engine, a plurality of related data processing events from a plurality of different data processing systems based on contextual similarity, computing a respective regulatory anchor set for each data processing event to generate a plurality of regulatory anchor sets, computing a convergence confidence score based on at least one or combination of: an anchor similarity score comparing anchor sets of the plurality of related events, a temporal alignment score measuring temporal proximity, and a cross-system reliability coefficient, in response to the convergence confidence score exceeding a threshold, generating a privacy fingerprint data structure by: merging the plurality of regulatory anchor sets from the plurality of related events, and structuring the merged plurality of regulatory anchor sets into at least one privacy fingerprint encoding verification data, wherein the privacy fingerprint excludes personal data and personal identifiers, and wherein feeding the regulatory anchor set into the deterministic reasoning engine comprises feeding the privacy fingerprint into the deterministic reasoning engine.

In a further implementation form of the first, second, and third aspects, the monitoring and the processing are implemented by a respective connector locally installed in each of the plurality of different data processing systems, the contextual metadata is extracted by the respective connector from each corresponding data processing system and sent to the server, the server generates the plurality of regulatory anchor sets and generate the privacy fingerprint, and operates the deterministic reasoning engine.

In a further implementation form of the first, second, and third aspects, the privacy fingerprint data structure comprises at least one of: a legal-state vector encoding at least one of: at least one candidate legal basis, a consent state indicator, a jurisdiction identifier, and a list of regulatory constraints, a retention-state vector encoding at least one of: a retention policy code and an expiration timestamp, a risk-state vector encoding: a risk score, a list of risk factors, and a list of required safeguards, a technical-context vector encoding at least one of: a system origin identifier, a processing action code, and a list of systems involved in the convergence, and a jurisdictional-context vector encoding: at least one applicable jurisdiction.

In a further implementation form of the first, second, and third aspects, the state anchors are selected from: a purpose anchor encoding a purpose vector, an operation anchor encoding a canonical operation code, a sensitivity anchor encoding an event sensitivity score, a transfer boundary anchor indicating whether the event cross a boundary, a jurisdiction anchor indicating a jurisdiction, a lawful basis anchor indicating lawful basis candidates, a retention anchor and/or expiration anchor indicating whether retention is expired, a risk and/or safeguards anchor indicating a risk score, a behavioral pattern and/or anomaly anchor indicating anomalous patterns, a convergence confidence anchor indicating a common processing context, a legal explanation and/or decision trace anchor indicating deterministic decision trace, a provenance evidence chain anchor indicating provenance, a technical context and/or execution environment anchor encoding execution context, and an adaptive monitoring and/or feedback state anchor implementing closed-loop monitoring.

In a further implementation form of the first, second, and third aspects, the purpose anchor is computed by: extracting a feature vector from the contextual metadata, applying a multi-signal purpose classifier to generate a purpose probability distribution over a plurality of canonical purpose classes, selecting a purpose band based on the purpose probability distribution, computing a confidence score based on a maximum probability value and a quality coefficient derived from signal completeness, and computing a purpose drift measure by calculating a divergence between the purpose probability distribution and a baseline purpose distribution for similar events.

In a further implementation form of the first, second, and third aspects, the lawful-basis anchor encodes: a lawful basis selected from: consent, contract, legal obligation, vital interests, public task, and legitimate interest, a consent state selected from: valid, expired, missing, withdrawn, not required, and unknown, and a list of constraint codes specifying conditions that must be satisfied for the data processing event to comply with the privacy policy.

In a further implementation form of the first, second, and third aspects, the retention anchor encodes: an allowed time-to-live value, an age value representing time elapsed since data creation, an expiration Boolean indicating whether retention has expired, a retention band selected from: active, near expiry, expired, and unknown, and a deletion capability classification indicating whether the data processing system supports automated deletion.

In a further implementation form of the first, second, and third aspects, the regulatory anchor set further comprises at least one of: a transfer boundary anchor encoding at least one of: a boundary classification selected from: internal, internal ETL, to third party, cross-border, and unknown, a third-party Boolean, a cross-border Boolean, a destination class, and a geographic destination identifier, a jurisdiction anchor encoding at least one of: a primary jurisdiction identifier, at least one secondary jurisdiction identifier, a controller locus identifier, and a subject locus identifier, and a technical context anchor encoding at least one of: an execution mode selected from: API call, batch job, export job, sync task, and ETL pipeline, a data flow direction selected from: inbound, outbound, and internal, and an integration type selected from: native, custom API, SaaS, and file export.

In a further implementation form of the first, second, and third aspects, the operation anchor is computed by: extracting operation signals from the contextual metadata including at least one of: API endpoint patterns, database operation types, job scheduler metadata, and network flow direction, applying a multi-signal operation classifier to generate an operation probability distribution over canonical operation codes, selecting a canonical operation code from: read, query, write, update, delete, export, share, and sync, and computing an operation confidence score and an operation drift measure.

In a further implementation form of the first, second, and third aspects, the deterministic reasoning engine computes the verification indication and the explanation trace by: loading the regulatory anchor set into memory, identifying applicable jurisdictional rules based on the jurisdiction anchor in the regulatory anchor set, evaluating conditions of the jurisdictional rules against values encoded in the state anchors, accumulating decision effects according to a rule hierarchy, selecting at least one legal basis from candidate legal bases in the lawful basis anchor based on satisfaction of rule conditions, and generating the explanation trace comprising: identifiers of triggered rules, anchor values evaluated, conditions satisfied, and the selected legal basis.

In a further implementation form of the first, second, and third aspects, the risk anchor is computed by computing a sensitivity score based on a category exposure multiplier derived from data categories in the contextual metadata, and a volume escalation effect derived from processing volume metrics, determining a transfer boundary classification indicating whether the data processing event crosses at least one of: an internal boundary, a third-party boundary, and a cross-border boundary, applying a risk model to the sensitivity score and the transfer boundary classification to generate the risk score, and determining required safeguards based on the risk score and jurisdictional requirements.

In a further implementation form of the first, second, and third aspects, the data processing system comprises a plurality of heterogeneous data processing systems, and further comprising: mapping different fields of the plurality of heterogeneous data processing system to canonical verification-context signals for performing semantic normalization of multi-source contextual data, wherein the regulatory anchor set is computed based on the canonical verification context-signals.

In a further implementation form of the first, second, and third aspects, further comprising: during a bootstrap phase, performing system profiling by: receiving, from a connector monitoring the data processing system, schema data describing data objects in the data processing system without receiving personal data, applying a ML model to the schema data to infer data categories and sensitivity classifications, and generating a monitoring plan specifying which events to monitor and which anchors to compute, and transmitting the monitoring plan to the connector for implementation.

In a further implementation form of the first, second, and third aspects, further comprising: computing a behavioral anomaly anchor by: calculating at least one of: a rate anomaly score, a burst anomaly score, and a temporal coherence score from aggregate telemetry data, computing an anomaly score from the calculated scores, and when the anomaly score exceeds a threshold, updating the monitoring plan to increase at least one of: sampling rate, evidence collection level, and enabled optional anchors, and transmitting the updated monitoring plan to the connector.

In a further implementation form of the first, second, and third aspects, further comprising: anchoring a multi-dimensional anchor template to the data processing event, wherein the multi-dimensional anchor template includes at least one of: (i) a legal dimension indicating jurisdictional requirements, consent requirements, candidate legal bases, and retention policies, (ii) a contextual dimension including at least one of purpose codes, processing actions, and data categories, (iii) a risk dimension indicating base risk scores, risk factors and technical constraints, selecting a type of the multi-dimensional anchor template from a plurality of multi-dimensional anchor templates of different types based on template selection criteria applied to the contextual metadata, and computing the regulatory anchor set by instantiating the selected multi-dimensional anchor template with values from the contextual metadata.

In a further implementation form of the first, second, and third aspects, further comprising: storing the plurality of multi-dimensional anchor templates in an anchor repository, wherein each multi-dimensional anchor template is versioned and associated with at least one of: an anchor type identifier, a jurisdiction pattern, a purpose code pattern, and a data category pattern, and resolving the selected multi-dimensional anchor template by: matching the contextual metadata against the jurisdiction pattern, purpose code pattern, and data category pattern of each anchor template, and selecting the multi-dimensional anchor template with highest priority among matching templates.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 7 is an example of anchor mappings, in accordance with some embodiments of the present invention; and FIG. 8 is a table of exemplary state anchors, in accordance with some embodiments of the present invention.

DETAILED DESCRIPTION

Figure 1:
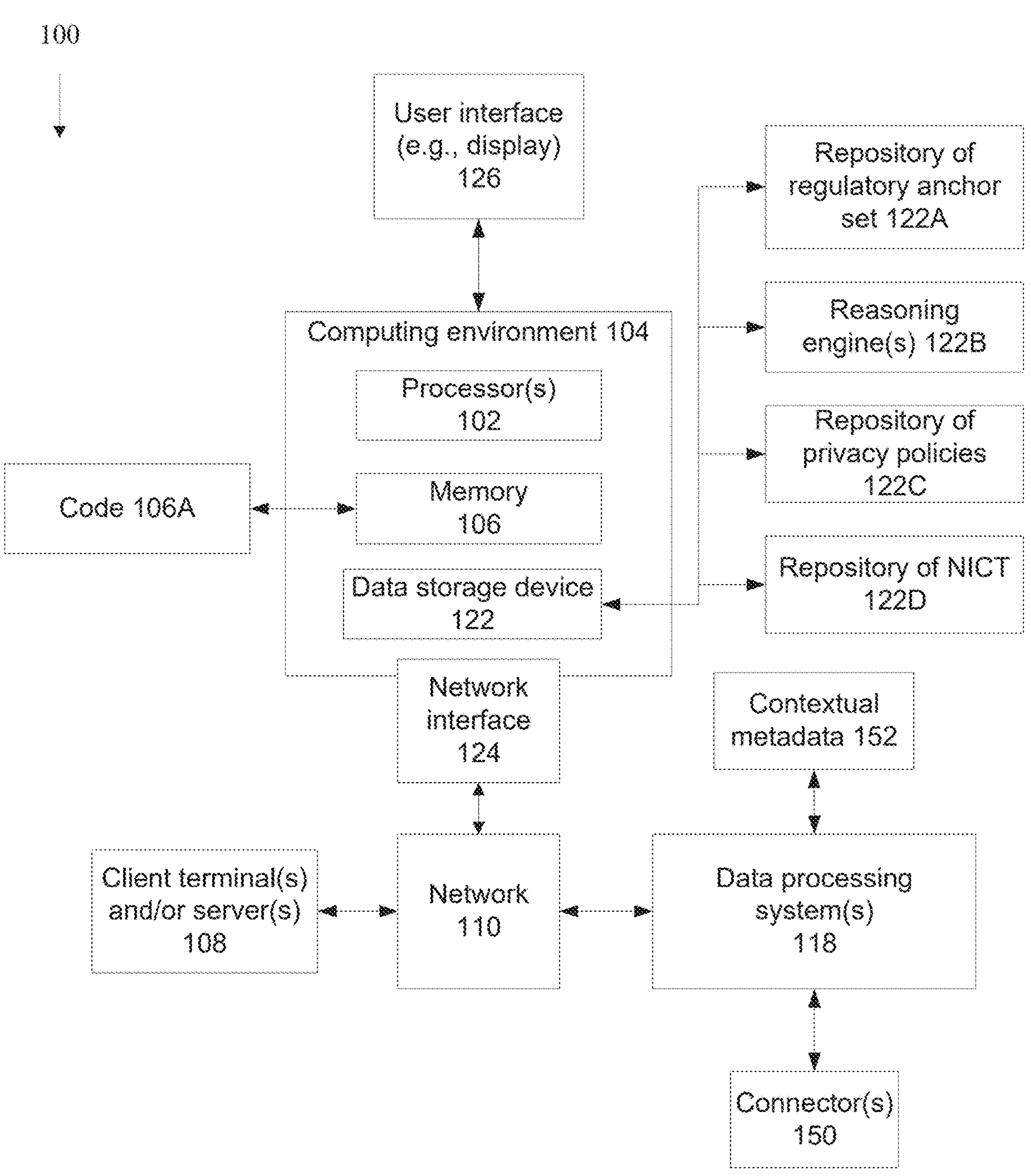
FIG. 1 is a block diagram of components of a system for automated verification that a data processing system(s) complies with a privacy policy, in accordance with some embodiments of the present invention.

The present invention, in some embodiments thereof, relates to data privacy and, more specifically, but not exclusively, to systems and methods for validation of data privacy during processing of private data.

As used herein, the terms verification and compliance are used interchangeably.

As used herein, the term privacy policy may include machine-executable rules derived from, for example, one or more of: statutes, laws, regulations, rules, guidance, and/or organization-specific policy requirements.

As used herein, identifiable data may include direct identifiers and/or persistent pseudonymous identifiers (e.g., cookie IDs, device IDs, hashed emails) and/or data fields that enable linkage to an individual without additional safeguards.

An aspect of some embodiments of the present invention relates to systems, methods, computing devices, and/or code instructions (stored on a data storage device and executable by one or more processors) for automatic verification of compliance of one or more data processing systems with a privacy policy. One or more data processing systems are monitored for detecting one or more data processing events. Candidate contextual metadata associated with the data processing event are extracted. The candidate contextual metadata may be filtered to reject fields matching patterns correlated with identifiable data, including, for example: email address, phone number, name, device identifier, cookies, pseudonym, network addresses, and/or hashed identifiers. The filtering generates contextual metadata that excludes data identifiable with a specific identity, such as a specific user. A regulatory anchor set is dynamically computed for the data processing event based on the contextual metadata, for example, by a connector executing within the data processing system and/or by a server. The regulatory anchor set includes multiple state anchors indicating a dynamic state computed based on current operation and/or current context. The regulatory anchor set excludes data identifiable with the specific identity. The regulatory anchor set is fed into a deterministic reasoning engine designed for verification of the privacy policy by applying jurisdictional rules. The reasoning engine computes a verification indication and optionally an explanation trace without using data identifiable with the specific identity. The reasoning engine may generate a non-identifiable confirmation (i.e., verification) token (NICT) including the verification indication and the optional explanation trace. The NICT excludes data identifiable with the specific identity. The NICT may trigger automatic actions, for example, pausing of processing by the data processing system in response to an indication that the privacy policy is being breached.

At least one embodiment described herein addresses the technical problem of verification of compliance with privacy laws during processing of data, where the verification itself creates privacy risks by relying on private data to perform the verification. At least one embodiment described herein improves the technology of data processing, by enabling verification of compliance with privacy laws during data processing without using private data. At least one embodiment described herein improves upon prior approaches of verification of compliance with privacy laws during processing of data, by enabling verification of compliance with privacy laws during data processing without using private data. At least one embodiment described herein provides the practical application of verification of compliance with privacy laws during processing of data, by enabling verification of compliance with privacy laws during data processing without using private data. At least one embodiment provides privacy compliance without using personal data.

As used herein, the term personal data (also referred to as personal information) may refer to data that identifies, relates to, describes, is reasonably capable of being associated with, and/or could reasonably be linked (directly or indirectly) to a specific natural person (also referred to herein as a data subject), whether alone or in combination with other data.

Personal data includes, for example:

1. Direct identifiers, such as a name, postal address, email address, telephone number, government-issued identifier, account number, customer number, or other unique personal identifier.
2. Persistent or device/network identifiers, such as cookie identifiers, mobile advertising identifiers, device identifiers, browser fingerprints, IP addresses, MAC addresses, and other network addresses or unique identifiers assigned to a device or software instance.
3. Pseudonymous identifiers and transformed identifiers that can be used to single out or link to a person, including hashed identifiers (e.g., hashed email), tokenized identifiers, or encrypted identifiers, when such identifiers enable linkage to a person or to a person-associated record.
4. Attributes and records associated with a person, including demographic data, employment data, financial data, transaction data, health-related data, biometric data, behavioral data, location data, communications content, and preference data, to the extent such data is linked or linkable to a specific person.
5. Combinations of data that, while not identifying on their face, together enable identification or linkage to a specific person (e.g., combinations of quasi-identifiers).

For clarity, in some embodiments described herein, data is treated as personal data if it includes a direct identifier or a persistent identifier, or if it is linkable to a person through a mapping, key, lookup table, identity graph, or other association mechanism.

In contrast, non-identifying contextual metadata, regulatory anchor sets, privacy fingerprints, and non-identifiable verification tokens (NICTs) as described herein are designed to exclude personal data and to encode (only) non-person-specific processing context and regulatory state.

There is a paradox involved in verification of compliance with privacy laws. Entities that process data (e.g., companies, organizations) are to comply with privacy laws, but compliance traditionally requires storing, centralizing, and/or processing personal data—which itself creates legal risk, operational friction, and/or technical complexity. Using existing approaches, entities cannot achieve real-time, accurate compliance without collecting or exposing sensitive user data.

An example of an existing approach—based on existing technologies, industry practices, and/or common engineering reasoning—is to attempt to improve compliance by centralizing even more personal data, not reducing it. Currently, entities (e.g., companies and/or existing vendors) perform compliance verification by gathering the user data into a unified store so that compliance logic can be run on top of it. This is usually done by building a larger, more complete centralized identity graph, adding manual or rule-based compliance layers on top of the data, and enhancing security instead of reducing data exposure. Another example of an existing approach is to strip some identifiers or pseudonymize them but still maintain a reversible or relational data model. Such approach does not solve the aforementioned privacy risk problem, but it still: stores personal data, enables re-identification, and requires heavy governance.

Existing approaches are based on the assumption that compliance verification requires personal data. For decades, privacy compliance has been built on a single unquestioned premise: "To determine if processing is legal, personal data needs to be analysed." Existing approaches are built around collecting, scanning, linking, and/or classifying personal data.

At least one embodiment computes an indication of legal compliance without using the personal data itself, by using abstracted contextual anchors and/or fingerprints.

At least one embodiment relates to privacy compliance technologies, specifically to systems that provide real-time, multi-jurisdictional legal compliance decisions without accessing personal data.

At least one embodiment provides a Contextual Privacy Fingerprinting Engine that enables full privacy-law compliance without necessarily requiring access to personal data. Instead of collecting or centralizing user information, in at least one embodiment raw events from multiple external systems are transformed into non-identifiable contextual signals, each representing legal meaning while excluding personal data. These contextual signals are processed through a multi-layer pipeline that normalizes, abstracts, and/or semantically enriches them into anchors which may be structured into privacy fingerprints—machine-readable representations of lawful basis, consent state, processing purpose, jurisdictional constraints, retention clocks, and/or risk indicators. Because anchors and/or fingerprints contain no identifiers and/or raw data, they eliminate the legal and technical exposure associated with traditional compliance tools.

Some exemplary use cases are now described.

In one example, of compliance auditing without access to personal data, an organization must prove that its marketing system only contacts users who have given valid consent under GDPR. Instead of storing and/or auditing personal data (e.g., email addresses, consent timestamps, user identifiers and/or raw logs) at least one embodiment replaces the aforementioned personal data (i.e., sensitive information) with one or more non-identifiable anchors and/or with a non-identifiable "privacy fingerprint." Instead of sending personal data to the auditing engine (as done using existing approaches that use personal data), each event is transformed into a contextual signal of an anchor, for example, {purpose: "email_marketing", consent_state: "valid", jurisdiction: "EU", timestamp " . . . " } This anchor excludes personal data such as email, name, and identifiers, and includes legal meaning while excluding personal attributes. The anchor cannot be reverse-engineered to identify the user. The compliance auditing engine then evaluates: "Was the action allowed under the consent and jurisdiction rules?". Examples of audit results include: "Compliant—consent valid at time of processing", "Not compliant—consent withdrawn before action", and "Not compliant—purpose mismatch under GDPR Article 6". The generation of the anchors and the processing of the anchors is done without ever accessing, storing, and/or analyzing the actual personal data—at least one embodiment performs full compliance auditing by analyzing context instead of identity, enabling accurate legal decisions without accessing the underlying personal data.

In another example, of retention and deletion decisions without accessing the actual data using an existing approach entities extract, centralize, and scan real user data to determine retention expiry. Using at least one embodiment, retention rules are encoded into a non-identifiable anchor. For example, {data_type: "transaction", retention: "24 m", created_at: "2022-01-10" } The engine computes, for example: "Retention expired—data should be deleted." This decision is made without accessing the private data itself (e.g., names, transactions, identifiers, addresses). In the downstream system that stores the data performs the deletion—at least one embodiment does not access and/or process the personal data. Privacy protection is provided by excluding central access to real data. In at least one embodiment, no duplication of sensitive information is performed. Retention compliance is enforced accurately without data exposure.

In yet another example, of cross-platform fraud detection across CRM+payment gateway+analytics system (compliance without personal data), a company wants to run a cross-platform fraud investigation combining signals from: a CRM system (e.g., customer status & account events), a payment gateway (e.g., transaction anomalies) and an analytics platform (e.g., behavioral pattern detection). Existing approach correlate identities across these systems, which is a high risk for privacy violation. In contrast, at least one embodiment uses context-only multi-anchors, and excludes identity data. An exemplary process is now described:

1. Contextual multi-anchors are received from three platforms:

CRM System Anchor {"event type": "ACCOUNT_ACTIVITY_CHECK," "purpose_code": "FRAUD_INVESTIGATION", "jurisdiction": "EU_IE", "data_categories:"["ACCOUNT_EVENT" ], "processing_mode": "ANALYZE", "system_origin": "crm_core", "consent_state": "NOT_APPLICABLE", "timestamp": "2025-11-18T14:00Z" }

Payment Gateway Anchor {"event type": "TRANSACTION_RISK_CHECK", "purpose_code": "FRAUD_DETECTION", "jurisdiction": "EU_IE", "data_categories": ["FINANCIAL", "TRANSACTIONAL" ], "processing_mode": "EVALUATE", "system_origin": "payment_gateway", "consent_state": "NOT_APPLICABLE", "timestamp": "2025-11-18T14:01Z" }

Analytics Platform Anchor {"event_type": "PATTERN_ANOMALY_SCAN", "purpose_code": "FRAUD_ANALYSIS", "jurisdiction": "EU_IE", "data_categories": ["BEHAVIORAL" ]".processing_mode": "MODEL_EVALUATION", "system origin": "analytics_engine", "consent_state": "NOT_APPLICABLE", "timestamp": "2025-11-18T14:01Z" }.

None of the aforementioned anchors include private data such as: user ID, transaction ID, card number, CRM identifier, behavioral fingerprints device IDs/IP. Rather, the anchors include non-identification and/or non-private context.

2. Context Fusion→Combined Privacy Fingerprint Generation. In at least one embodiment, the three multi-anchors are fused (e.g., structured) into a combined Privacy Fingerprint representing a fraud investigation context, not a person. At least one embodiment provides cross-platform legal state fusion without identity. The fingerprint, generated based on the anchors, includes: {"pf_id": "pf 4ab32 . . . ", "purpose": {"code": "FRAUD_INVESTIGATION," "requires_consent": false, "classification": "SECURITY_COMPLIANCE" }, "legal_state {:" "candidate_bases": ["LEGAL_OBLIGATION", "LEGITIMATE_INTEREST" ], "consent_state:" "NOT_APPLICABLE", "jurisdiction": "EU_IE" }, "retention_state": {"policy_code:" "RET_FRAUD_72M", "expires_at": "2031-11-18T00:00Z" }, "risk_state": {"risk_score:" 0.68 "risk_factors": ["CROSS_PLATFORM_ANALYSIS", "FINANCIAL_DATA," "BEHAVIORAL_EVALUATION" ]}, "technical_context": {"systems_involved" ]: "crm_core", "payment_gateway", "analytics_engine" ], "processing_actions" ]: "ANALYZE", "EVALUATE", "MODEL_EVALUATION" ]}} The aforementioned fingerprint expresses. legal obligations (fraud/security) data category sensitivities multi-system participation elevated risk requiring safeguards without any personal data.

3. Regulation-Aware Reasoning Engine Evaluation. The Reasoning Engine applies jurisdictional logic. For example: Jurisdiction: EU (Ireland→GDPR applies). Fraud detection is allowed under legitimate interest. Payment fraud investigations also qualify under legal obligation. Special-category implications (behavioral+financial) trigger safeguards. Cross-platform combination allowed because no personal data is exchanged and contextual signals are used. Engine conclusions: Processing is permitted but must apply safeguards: strict access control audit logging model transparency. The engine does this using vectors—not data.

4. Output: Non-Identifying Compliance Token (NICT)

{"nict_id": "token_fa93e . . . ", "allowed": true, "legal basis": "LEGAL_OBLIGATION", "decision_code:" "FRAUD_CROSS_PLATFORM_ALLOWED",
"conditions": ["APPLY_STRICT_ACCESS_CONTROL", "LOG_INVESTIGATION_STEPS," "LIMIT_RETENTION_TO_RET_FRAUD_72M" ], "explanation": {"summary": "Cross-platform fraud investigation allowed under GDPR Art. 6(1)(c) legal obligation.", "rules_applied": ["GDPR_IE.FRAUD_LEGAL_OBLIGATION",
"GDPR_COMMON.SECURITY_EXCEPTION" ], vector_evidence": ["candidate_bases include LEGAL_OBLIGATION",
"purpose.classification=SECURITY_COMPLIANCE", "no personal data processed" ]}}.

No personal data was processed during cross-platform correlation fraud evaluation decision generation in the aforementioned example.

At least one embodiment is different than, and/or improves upon, existing approaches. Existing privacy compliance systems use, for example, identity graphs, consent databases, cross-system data warehouses, and/or raw event logs. These approaches inherently contradict data-minimization principles and expose personal data. No prior system can perform compliance evaluation without identity, leading to increased regulatory risk and system complexity.

For example, one existing approach is directed towards a Consent & Preference Management System for generating and managing consent receipts. This approach builds consent databases based on user identity, tracks who gave consent, which data it applies to, and when it occurred. This approach stores personal data and user identifiers internally. In contrast, at least one embodiment does not store any personal data. Contextual Multi-Anchors (e.g., purpose, jurisdiction, data category, consent state) may be structured to create a Privacy Fingerprint. Compliance decisions are made without knowing who the user is. In summary, the prior approach is directed towards consent management dependent on identity. At least one embodiment performs consent validity and legal decisions without identity at all, based (only) on abstract legal context.

Another example relates to another existing approach directed towards data discovery and/or data mapping systems for discovery of personal data inside ML models. This existing approach scans databases to find personal data, builds a map of which tables, fields, or models contain sensitive information. This approach requires accessing real personal data. In contrast, at least one embodiment does not scan and/or map personal data. Anchors and/or a Privacy Fingerprint describing the legal context of a processing event (e.g., purpose, lawful bases, retention rules, risk vectors), are generated. In summary, this existing approach is directed towards the technical problem "Where is the personal data located?". At least one embodiment is directed towards the technical problem "What is the legal state of the processing?"—without touching the personal data at all.

Yet another example relates to identity graphs and/or customer 360 profiles. Such prior approach uses an identity graph for linking user attributes by combines identifiers from CRM, web, mobile, email, ads, etc. Unified user identity profiles (Customer 360) are generated. In this prior approach, the entire logic depends on identity resolution. In contrast, at least one embodiment removes the identity entirely. There is no process of unifying identifiers and/or creating profiles. At least one embodiment generates an Anchor and/or Privacy Fingerprint, which is different than a user record generated by the prior approach. In summary, the prior approach is directed towards: more identity→more personalization→more data. At least one embodiment is directed towards—no identity, while retaining the ability to produce accurate privacy-law compliance decisions.

Yet another example relates to data subject access request automation (DSR/DSAR). Such systems for fulfilling DSAR requests are directed towards collecting personal data from all internal systems to answer "What data do you have about me?". This requires identity verification and collecting all user-related records. In contrast, at least one embodiment is directed to answering all legal parts of a DSR (purpose, lawful basis, retention, system locations) using anchors and/or fingerprint aggregation, excluding raw personal data. The final retrieval may happen in the source systems. In summary the existing approach is directed to "Bring all of the personal data into one place", while at least one embodiment is directed to "Bring only the legal context, never the data."

Yet another example relates to governance, risk and compliance (GRC) framework and/or static rule-based compliance that uses manual rules, policies, workflows, and/or documentation. The compliance logic is not dynamic or contextual, and not real-time. In contrast, at least one embodiment provides a regulation-aware reasoning engine that computes decisions dynamically using the anchors and/or privacy fingerprint, and generates a "allow/deny/legal basis" decisions in real-time or near real-time. In summary, the existing approach is based on static, manual, human-driven rules. At least one embodiment is based on automated real-time legal reasoning based on abstract context.

Yet another example relates to explainable AI (XAI) and/or model transparency that explains machine-learning predictions using feature importance and/or attribution approaches. Such prior approach is not designed for legal or regulatory reasoning. In contrast, at least one embodiment provides explainable legal reasoning, not ML reasoning. A rule-trace explaining exactly which laws applied, which context vectors triggered them, how the lawful basis was selected, and/or why the processing is allowed/blocked, is generated. In summary, the prior approach is directed towards ML model explainability. At least one embodiment is directed towards regulatory explainability for privacy decisions, without personal data.

The aforementioned prior approaches all require accessing and/or processing personal data These prior approaches depend on identity. They centralize or unify datasets. They analyze or classify real user information. They perform compliance on top of personal data. In contrast, no personal data is required or processed by at least one embodiment. In at least one embodiment, compliance is achieved using abstract legal context anchors and/or privacy fingerprints that replace identity and/or raw data legal decisions are computed dynamically, in real time A generated explanation is rooted in regulatory logic, not data analysis. The entire compliance layer is identity-free. At least one embodiment represents a technology paradigm shift from Data-Based Compliance to Context-Based Compliance.

Additional examples of exemplary technical problems which are addressed by at least one embodiment described herein include:

1. Regulations demand "Context-Based" decision, whereas entities (e.g., organizations) use static rules. Regulators expect dynamic interpretations (e.g., GDPR Art. 5,6; 21, CCPA; Israeli Amendment 13). Businesses rely on checklists. Technical problem: Human-based compliance cannot scale or respond in real time. At least one embodiment solves the technical problem by providing data for a compliance evaluation using a system that scales and/or responds in real-time or near real-time.

2. High risk of non-compliance due to manual interpretation. Entities (e.g., organizations) frequently fail to apply correct legal bases. Valid retention limits real user consent data minimization cross-border restrictions exception scenarios. Technical problem: Manual compliance creates legal exposure (fines, lawsuits, regulator audits). At least one embodiment solves the technical problem by automatic generation of compliance.

3. Data Subject Requests (DSRs) are almost impossible to fulfill accurately without unified context. Companies cannot correctly answer, for example: "What data do you have about me?" "What was the purpose?" "Did I consent?" "Who accessed it" ? Technical problem: Existing tools do not assemble a cross-system, legally accurate report. At least one embodiment solves the technical problem by automatically generating a cross-system, legally accurate, indication.

4. No way to automatically determine what an organization is allowed to do. For example, marketing, analytics, AI training, fraud detection, and/or operations frequently overlap. Technical problem: Entities (e.g., businesses) need automatic decision making, for example: Can we use this data? For which purpose? Under which jurisdiction? Is consent valid? At least one embodiment solves the technical problem by automatically generating anchors which may be used to provide answers to the aforementioned questions.

5. Lack of a mechanism to explain legal decisions (explainability problem). Regulators expect explainable decisions, especially in AI contexts. Entities (e.g., companies) cannot justify automated processing choices. Technical problem: No explainable, structured, machine-readable compliance reasoning exists. At least one embodiment solves the technical problem by providing explainable, structured, machine-readable compliance reasoning.

At least one embodiment solves the problem of interpreting fragmented, multi-system signals about personal data into a consistent, real-time, explainable compliance determination.

At least one embodiment improves upon existing approaches which require personal data, and therefore create risk, liability, and/or complexity. Such prior approaches cannot produce real-time decisions (e.g., prior static and/or human-centric approaches), they cannot solve cross-system problems (e.g., due to fragmented architectures), they depend on identity (e.g., which is error-prone and/or hard to maintain), they cannot explain their decisions in a machine-readable way, they cannot scale to modern data volumes, they cannot fulfill DSRs without data exposure, their architecture violates the principle of data minimization, they cannot support secondary-purpose and contextual decisions, and/or they are not safe for cross-border operations. At least one embodiment provides one or more of: real-time decisions, solving cross-system problems, does not depend on identity, explains decisions in a machine-readable way, scale to modern data volumes, fulfill DSRs without data exposure, architecture does not violate the principle of data minimization, support secondary-purpose and contextual decisions, and/or they are safe for cross-border operations.

At least one embodiment enables an entity (e.g., organization) to execute privacy-law compliance, including, for example, lawful-basis determination, consent validation, retention decisions, cross-border assessments, and/or audit generation without receiving or storing personal data. Instead of processing user data, the system uses Contextual Multi-Anchors that capture the legal context of an action, then optionally transforms them into a Privacy Fingerprint, a non-identifying structure representing the legal state of a processing operation. Compliance may be computed using a Regulation-Aware Reasoning Engine, which outputs a Non-Identifying Compliance Token representing the permitted action and legal justification.

At least one embodiment improves upon alternative approaches. The alternative approaches, for example:

- Require personal data (e.g., which creates risk, liability, and/or complexity).
- Cannot produce real-time decisions (e.g., Static, Human-Centric Approaches).
- Cannot solve cross-system problems (e.g., fragmented Architectures).
- Depend on identity (e.g., which is error-prone and/or hard to maintain).
- Cannot explain their decisions in a machine-readable way.
- Cannot scale to modern data volumes,
- Cannot fulfill DSRs without data exposure.
- Their architecture violates the principle of data minimization.
- Cannot support secondary-purpose+contextual decisions.
- They are not safe for cross-border operations.

At least one embodiment provides one or more of the following improvements over alternative approaches: Contextual Multi-Signal Fusion (Instead of Static Fields)—Fuse contextual indicators (e.g., purpose, jurisdiction, data category, system origin, consent condition, processing mode) into a unified structure—without identity. This dynamic context fusion may replace checklists with real-time context inference.

Generate a Privacy Fingerprint (PF) Instead of Using Raw Data PF—non-identifying legal context object that encodes regulatory state vectors. This may avoid the need for humans to interpret raw data.

Adaptive Legal-State Vector Selection PF—automatically generates candidate lawful bases consent requirements jurisdiction constraints based solely on contextual metadata. In contrast, most systems assume user identity is checked to select lawful basis.

Regulation-Aware Reasoning Engine—A machine-readable, rule-based legal interpretation engine that evaluates privacy fingerprints instead of data. The system may perform real legal reasoning with: cascading rules jurisdictional overrides exception handling balancing tests. In contrast, compliance vendors assume access to personal data to compute legality.

Automated Retention-State Vector Without Storing Data Retention—decisions may be made via a PF retention vector, in contrast to processing the underlying data or identity.

Identity-Agnostic Risk-State Computation Risk—is computed without any user-level attributes.

Data Subject Requests (DSRs) Hard to Fulfill Accurately Problem: It is technical challenging to assemble cross-system, legally accurate reports.

DSR Interpretation Without Access to the Data Itself Using PFs—a system may answer: What purposes exist Legal bases Consent states Retention policies System origins without accessing personal data.

Purpose & Permission Reconstruction from Context Instead of Raw Data—The PF may encode "why data would be processed," not "who it belongs to." This potentially allows highly accurate responses without identity and without exposing personal data.

Cross-System Legal State Reconstruction Using Fingerprints Inter-system DSR—reconstruction may be implemented through PF aggregation—no need to unify databases or identity graphs. In contrast, other approaches assume DSRs require collecting raw personal data from multiple systems.

No Way to Automatically Determine What an Organization Is Allowed to Do Problem: Entities (e.g., companies) do not know if they are allowed to process data for certain purposes.

Non-Identifying Compliance Token (NICT)—Instead of returning raw data, the system issues a token: allowed/not allowed legal basis conditions explanation trace. The NICT contains no personal data.

Identity-Free Lawful Basis Determination Lawful—basis is computed using PF vectors, not user attributes. Marketing→consent Security→legitimate interest Analytics→secondary purpose restrictions etc.

Multi-Jurisdiction Constraint Evaluation Without Geographic Data—The system uses jurisdictional context in PFs—never raw IP, country field, or location. In contrast, other approaches use IP/address for jurisdiction.

Lack of Explainability for Legal Decisions Problem: AI and automated decisions require full explanation.

Rule Trace Extraction From a Contextual Legal Reasoning Engine—Compliance decisions include: rule IDs triggered conditions vectors used fallback logic. This may produce structured, legally explainable outputs.

Machine-Readable Explanation Graph PF vectors→rule evaluations→output reasoning All captured in a structured explanation object.

Auditable Compliance Without Personal Data Audits contain: PF IDs NICT tokens rule paths None contain any personal identifiers. In contrast, other approaches assume audits must include personal data samples.

At least one embodiment provides one or more of:

Compliance without personal data.

Privacy fingerprint as a legal-state abstraction.

Contextual multi-signal fusion.

Non-identifying compliance token.

No dependency on user identity, profiles, and/or identifiers.

Legal reasoning based solely on context.

At least one embodiment provides real-time privacy compliance decisions without using, processing, or storing personal data, by receiving contextual multi-signals describing processing circumstances, transforming the contextual multi-signals into a Privacy Fingerprint, a non-identifying legal-context abstraction, interpreting the fingerprint via a Regulation-Aware Reasoning Engine, and returning a Non-Identifying Compliance Token (NICT) containing the legal conclusion and reasoning. The system never requires user identity (e.g., email, phone, device ID, cookie, or pseudonym). The engine is built to be identity-agnostic by design.

At least one embodiment relates to Compliance-by-Architecture, built on three core principles:

(A) Edge Minimization: minimal local processing and prevention of personal identifiable information (PII) leakage. A Connector/Agent is installed in each organizational system and performs:

Monitoring of processing events (e.g., export, batch read, API read/write),

Extraction of non-identifying context signals (contextual metadata),

Hardening before transmission: schema filtering and rejection/removal of any PII-like values.

Result: the Core (e.g., computing environment such as a server and/or computing cloud) does not receive "people data"; it receives a non-identifying regulatory abstraction of the operation.

(B) Replacing static metadata labels with a dynamic Regulatory Anchor Set (state-based anchors). Instead of relying on static metadata tags (e.g., "purpose=marketing"), the system computes for each event a Regulatory Anchor Set: a set of state anchors calculated in real time (e.g., Purpose Context, Lawful Basis State, Consent State, Retention State, Jurisdiction Applicability, etc.).

For example:

Traditional metadata may say: "purpose=marketing."

Anchor #1 (PURPOSE CONTEXT) computes a dynamic state based on the actual operation and context, for example:

operation=export, context=role=Sales, time=after-hours, destination=third party⇒determine whether the stated purpose is consistent with the actual context and compute a deviation/risk state.

(C) Deterministic reasoning without PII+generation of a non-identifying token (NICT).

The Core applies a deterministic decision mechanism (rule/graph evaluation) to:

1. Determine regulatory applicability (e.g., via a jurisdiction applicability anchor).
2. Evaluate rule conditions over the anchor states.
3. Produce a Compliance Indication (e.g., allow/block/conditional).
4. Generate a Non-Identifiable Compliance/Verification Token (NICT) including trace/explanation artifacts.

Outcome: the system can demonstrate and audit compliance without storing or processing personal data in the Core.

At least one embodiment solves the aforementioned technical problem(s), and/or improves the aforementioned technical field(s), and/or improves upon the aforementioned prior approach(es), and/or provides the aforementioned practical application(s), by automatic verification of compliance of one or more data processing systems with a privacy policy. One or more data processing systems are monitored for detecting one or more data processing events. Candidate contextual metadata associated with the data processing event are extracted. The candidate contextual metadata may be filtered to reject fields matching patterns correlated with identifiable data. The filtering generates contextual metadata that excludes data identifiable with a specific identity, such as a specific user. A regulatory anchor set is dynamically computed for the data processing event based on the contextual metadata. The regulatory anchor set includes multiple state anchors indicating a dynamic state computed based on current operation and/or current context. The regulatory anchor set excludes data identifiable with the specific identity. The regulatory anchor set is fed into a deterministic reasoning engine designed for verification of the privacy policy by applying jurisdictional rules. The reasoning engine computes a verification indication and optionally an explanation trace without using data identifiable with the specific identity. The reasoning engine may generate a non-identifiable confirmation (i.e., verification) token (NICT) including the verification indication and the optional explanation trace. The NICT excludes data identifiable with the specific identity. The NICT may trigger automatic actions, for example, pausing of processing by the data processing system in response to an indication that the privacy policy is being breached.

At least one embodiment provides systems and/or methods for evaluating regulatory compliance of data processing activities without reliance on personal identifiers. For each monitored data processing event, a regulatory anchor set is computed based on non-identifying contextual, technical, behavioral, and regulatory signals associated with the event.

Optionally, the regulatory anchor set is evaluated by a deterministic reasoning engine to generate an event-level non-identifying compliance token (NICT), representing a machine-verifiable compliance determination and its underlying regulatory rationale. The generation of an event-level NICT is performed independently for each event, regardless of whether related events are later identified or aggregated.

In some embodiments, multiple events originating from one or more systems may be evaluated for convergence based on similarity of their respective regulatory anchor sets, temporal alignment, and technical execution context. Upon determining convergence, an aggregated processing context may be formed, from which a derived privacy fingerprint and, optionally, an aggregated compliance evaluation may be generated.

Convergence between multiple data processing events may be determined based on a combination of anchor-derived features, temporal proximity between events, and technical or network-context attributes. A similarity evaluation may be computed using weighted comparison of selected anchor dimensions, including but not limited to purpose classification, jurisdictional context, transfer characteristics, and technical execution context. A confidence score may be derived from such similarity evaluation and temporal alignment. Threshold conditions and suppression rules may be applied to prevent false convergence between unrelated events.

Optionally, the privacy fingerprint is a derived artifact used for cross-event analysis, correlation, and audit, and does not replace event-level compliance evaluation. Deterministic rule-based reasoning governs compliance decisions, while any artificial intelligence components, if used, are limited to assistive or explanatory functions and are not determinative of compliance outcomes.

In some embodiments, for each monitored data processing event, the system computes a regulatory anchor set specific to that event and performs a deterministic regulatory evaluation based on the computed anchor set. As a result of this evaluation, an event-level non-identifying compliance token (NICT) is generated for each event, irrespective of whether the event is later associated with other events or aggregated into a converged processing context.

In some embodiments, regulatory anchors represent the computed regulatory state of an individual data processing event and constitute the primary input to compliance decision-making. Anchors encode regulatory, technical, behavioral, and contextual attributes relevant to the legality of the event.

In some embodiments, a privacy fingerprint, where generated, is a structured aggregation derived from multiple anchor sets associated with converged events and is used to represent a broader processing context. The privacy fingerprint is not required for, and does not substitute for, event-level compliance evaluation, which is performed directly on anchor sets.

In some embodiments, the system evaluates whether multiple data processing events correspond to a common processing activity across one or more systems. Convergence determination is performed by a convergence engine configured to evaluate similarity and coherence between regulatory anchor sets associated with different events.

In some embodiments, the convergence engine derives feature vectors from anchor outputs, including one or more of: purpose classification, jurisdictional scope, transfer boundary indicators, technical execution context, risk characteristics, and non-identifying network context. Temporal features, including event timing, execution cadence, and processing sequence, may also be evaluated.

In some embodiments, a similarity score is computed based on weighted comparison of anchor-derived features, and a convergence confidence score is determined as a function of similarity, temporal alignment, and source reliability. One or more gating rules may be applied to suppress false convergence, including mandatory agreement on jurisdictional scope or transfer boundary classification and constraints on permissible time windows.

In some embodiments, convergence is declared when the computed confidence satisfies predefined criteria. The specific weighting, thresholds, and feature selection may vary by deployment and are configurable without altering the principles described herein.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
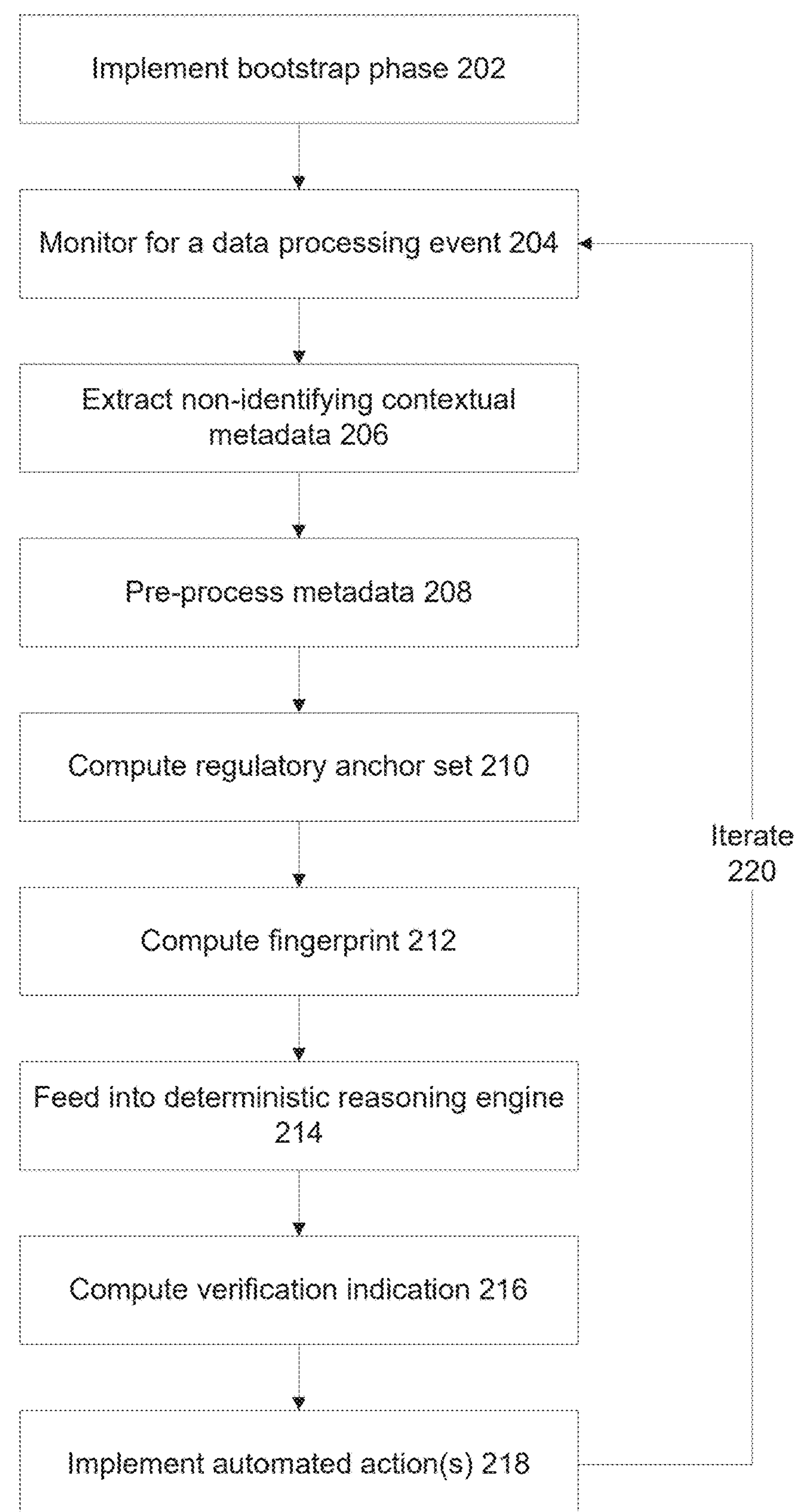
FIG. 2 is a flowchart of a method of automated verification that a data processing system(s) complies with a privacy policy, in accordance with some embodiments of the present invention.
Figure 3:
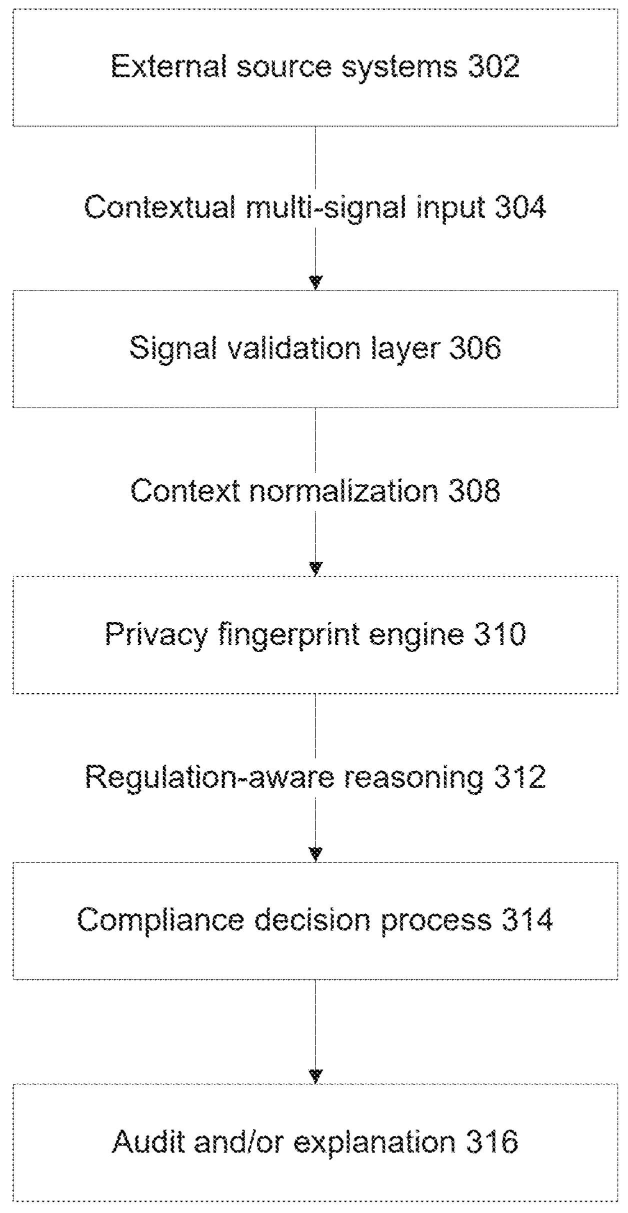
FIG. 3 is a dataflow diagram for automated verification of a privacy policy, in accordance with some embodiments of the present invention.
Figure 4:
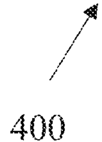
FIG. 4 is a table of exemplary anchor types, in accordance with some embodiments of the present invention.
Figure 5I:
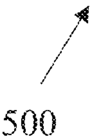
FIG. 5 is an example of a first anchor, in accordance with some embodiments of the present invention.
Figures 6, 6I:
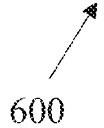
FIG. 6 is an example of a second anchor, in accordance with some embodiments of the present invention.

Reference is now made to FIG. 1, which is a block diagram of components of a system 100 for automated verification that a data processing system(s) 118 complies with a privacy policy, in accordance with some embodiments of the present invention. Reference is also made to FIG. 2, which is a flowchart of a method of automated verification that a data processing system(s) complies with a privacy policy, in accordance with some embodiments of the present invention. Reference is also made to FIG. 3, which is a dataflow diagram for automated verification of a privacy policy, in accordance with some embodiments of the present invention. Reference is also made to FIG. 4, which is a table 402 of exemplary anchor types, in accordance with some embodiments of the present invention. Reference is also made to FIG. 5, which is an example of a first anchor 500, in accordance with some embodiments of the present invention. Reference is also made to FIG. 6, which is an example of a second anchor 600, in accordance with some embodiments of the present invention. Reference is also made to FIG. 7, which is an example of anchor mappings 700, in accordance with some embodiments of the present invention. Reference is also made to FIG. 8, which is a table 800 of exemplary state anchors, in accordance with some embodiments of the present invention.

Referring now back to FIG. 1, system 100 may implement the acts of the method described with reference to FIGS. described herein, by processor(s) 102 of a computing environment 104 executing code instructions stored in a memory 106 (also referred to as a program store).

The architecture described with reference to FIG. 1 may be designed to reduce attack surface by preventing personal data ingress into a core compliance system.

In an exemplary embodiment, computing environment 104 verifies that processing performed by one or more data processing systems 118 complies with one or more privacy policies (e.g., hosted by a repository of privacy policies 122C).

Data processing system(s) 118 may be operated by, and/or in communication with, one or more client terminal(s) and/or server(s) 108. Examples of data processing systems 118 include: customer relationship management (CRM), accounting systems, marketing systems, billing systems, analytics, and human resources.

Connector(s) 150 associated with data processing system (s) 118 may monitor data processing system(s) for data processing event(s) and/or may extract contextual metadata 152, as described herein.

Computing environment 104 may be implemented as, for example one or more and/or combination of: a group of connected devices, a client terminal, a server, a virtual server, a virtual machine, a desktop computer, a thin client, a network node, and/or a mobile device (e.g., a Smartphone, a Tablet computer, a laptop computer, a wearable computer, glasses computer, and a watch computer).

Computing environment 104 executing stored code instructions 106A, may be implemented as one or more servers (e.g., network server, web server, a computing cloud, a virtual server) that provides centralized services to one or more data processing systems 118, for centrally verifying that processing by each data processing system 118 complies with one or more privacy policies (e.g., hosted by repository of privacy policies 122C), as described herein. Contextual metadata 152 is extracted from respective data processing systems 118, for example, by connectors 150 and/or client terminal(s) and/or other devices and/or processes. Contextual metadata 152 may be provided to computing environment 104 over a network 110. An indication of verification of compliance with the privacy policy, optionally implemented as a non-identifiable verification token (NICT), may be generated and stored in repository of NICT 122D, provided to client terminal(s) 108, and/or provided to other devices and/or executing processes. Services for verification of compliance with the privacy policy may be provided by computing environment 104 to data processing system(s) 118 and/or client terminals(s) 108, for example, as software as a service (SaaS), a software interface (e.g., application programming interface (API), software development kit (SDK)), an application for local download to the client terminal(s) and/or server(s) 108, an add-on to a web browser running on client terminal(s) and/or server(s) 108, and/or providing functions using a remote access session to the client terminal(s) and/or server(s) 108, such as through a web browser executed by client terminal 108 accessing a web site hosted by computing environment 104. For example, each client terminal(s) 108 and/or server(s) may access a graphical user interface (GUI) hosted by computing environment 104, to select the data processing system(s) for monitoring and/or the privacy policy used to evaluate compliance.

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices. Processor(s) 102 may be running within the computing cloud implementation of computing environment 104.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. provided herein when executed by hardware processor(s) 102. Memory 106 may be implemented within the computing cloud implementation of computing environment 104.

Computing environment 104 may include a data storage device 122 for storing data, for example, repository of regulatory anchor sets 122A, reasoning engine(s) 122B, repository of privacy policies 122C, repository of NICT 122D, and/or other data and/or other processes described herein. Data storage device 122 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point-to-point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 includes and/or is in communication with one or more user interfaces 126, which may be designed to enable input of data and/or viewing of data. Exemplary user interfaces 126 include, for example, one or more of, a touchscreen, a display, gesture activation devices, a keyboard, a mouse, and voice activated software using speakers and microphone.

Although not shown explicitly in FIG. 1, in some embodiments the contextual metadata 152 extracted and transmitted by connectors 150 includes non-identifying application-level, operating-system-level, runtime/container-level, and network-context signal classes associated with a monitored data processing event. By way of example, the contextual metadata 152 may include, without limitation, execution mode and job/scheduler class, operating system family/class, runtime substrate class (e.g., Kubernetes/VM/serverless), workload/container class, host class, service-account class, and network context classes such as egress-path class, network segment/zone class, and destination network class, while excluding instance identifiers and personal identifiers. Further, although not shown explicitly in FIG. 1, in some embodiments the system supports an audit mode in which authorized audit users and/or audit processes access stored NICTs in repository 122D and, using audit privilege, may resolve an encrypted event reference included in a NICT to validate or retrieve a corresponding underlying event record; such audit-mode access is logically represented as a restricted (e.g., dashed) audit access path to the NICT repository 122D and related audit services, and is separate from non-audit access paths.

Referring now back to FIG. 2, although FIG. 2 depicts anchor computation, fingerprint generation, and reasoning in a sequential manner for ease of illustration, in some embodiments the operational flow is logically branched. In a first (per-event) branch, for each detected data processing event the system computes a respective regulatory anchor set (act 210), performs deterministic reasoning on the event-level regulatory anchor set (act 214), and generates a respective non-identifying compliance/verification token (NICT) for the event (act 216). In a second (conditional) branch, convergence across multiple related events is optionally performed to determine whether two or more events correspond to a common logical processing activity; upon convergence confidence satisfying one or more thresholds does the system generate a privacy fingerprint as a derived aggregation artifact (act 212) from multiple event-level anchor sets, and optionally perform aggregated reasoning and/or produce an aggregated explanation trace for the common processing activity, while still optionally retaining the per-event NICTs. Accordingly, privacy fingerprint generation is not required for per-event compliance determinations, and per-event anchor computation and deterministic evaluation may occur independently of convergence.

For clarity, in some embodiments acts 210, 214, and 216 are performed for each detected data processing event, such that each event produces a respective regulatory anchor set and a respective per-event NICT. Act 212 (privacy fingerprint computation) is conditional and is performed when a convergence determination indicates that multiple events are related to a same logical processing activity; accordingly, a privacy fingerprint is a derived aggregation artifact created after convergence and is not required for per-event compliance reasoning or per-event NICT generation.

At 202, a bootstrap phase may be implemented.

System profiling may be performed during the bootstrap phase. The system profiling may be performed by the server receiving schema data describing data objects in the data processing system without receiving personal data. The schema data may be received from a connector monitoring the data processing system. There may be multiple connectors, where each connector may be designed for installation in a respective data processing system. The connectors may perform one or more features as described herein. The connectors may serve as a gateway and/or communication channel for communication with the computing environment (e.g., server), for example, for sending of monitoring data and/or receiving instructions. The connector may be implemented as, for example, a virtual interface such as an API and/or SDK, agent, sidecar, proxy, plugin, daemon, gateway module, log shipper, service mesh filter, and the like. The connector may be designed to send object/table names+schema+basic statistics (counts/types), excluding other data. A ML model may be applied to the schema data to infer data categories and/or sensitivity classifications. The ML model may analyze the schema data to determine one or more of: Existing data structures (e.g., tables/objects/files), which fields are regulatorily relevant, and/or how to map signals into a canonical model. The ML model may perform one or more of: semantic classification of objects/fields (e.g., identifying "contact_notes" as high-risk free text), probabilistic assignment of the data category and/or sensitivity, and/or recognition of known system patterns (e.g., CRM/HR/ERP) to adapt monitoring templates. The ML model may be implemented as a classifier (e.g., gradient-boosted trees or a lightweight transformer over field names/descriptions) to infer one or more of: PII-likely vs non-PII-likely, category (e.g., contact/finance/HR), sensitivity weight/confidence. A monitoring plan specifying which events to monitor and which anchors to compute may be generated. A respective monitoring plan may be generated for each connector. The monitoring plan may include one or more of: what to monitor, when to emit events, which anchors to compute, resolution/thresholds, and/or which fields/patterns are to be blocked pre-transmission. The ML model may perform one or more of: propose an optimized monitoring plan based on observed patterns, identity risk hotspots (e.g., exports, high-volume endpoints), and/or update the plan over time (adaptive monitoring & feedback anchor). The monitoring plan may be transmitted to the connector for implementation.

In addition to application-level metadata, the connector may be designed to collect non-identifying execution and runtime context signals associated with data processing events. Such signals may include, by way of example, process or service class identifiers, execution environment type, workload or container class, scheduler or job type, and host or runtime platform class.

These execution and runtime context signals do not identify individuals and are used to compute technical and behavioral regulatory anchors, support cross-system correlation, and improve accuracy of convergence determination. Optionally, a privacy-by-design onboarding step is implemented, where, during connector installation/initialization, the server performs a non-content system profiling (schema/structure-level), and sends back operational guidance to the connector. The operational guidance to be implemented by the connector includes, for example, canonical mappings, sensitivity classification, and/or monitoring/exclusion instructions (monitoring plan).

Optionally, a behavioral anomaly anchor is computed by the server. The behavioral anomaly anchor may be computed from aggregate telemetry data including: abnormal volume/frequency, unusual usage patterns, and/or drift suggesting a change in actual purpose or misuse. One or more of the following scores may be computed from the aggregated telemetry data: a rate anomaly score, a burst anomaly score, and/or a temporal coherence score. The aforementioned scores may be computed, for example, by one or more of the following ML approaches and/or statistical approaches: Isolation Forest/LOF, EWMA/Z-score, Change-point detection.

An anomaly score may be computed from the calculated scores, for example, as a weighted function thereof. When the anomaly score exceeds a threshold, the monitoring plan may be dynamically adapted to increase at least one of: sampling rate, evidence collection level, and/or enabled optional anchors. The updated monitoring plan is transmitted to the connector.

At 204, one or more data processing systems may be monitored for detecting one or more data processing events.

The data processing events may be pre-defined based on likelihood of including private information which violates the privacy policy. The data processing events may be selected, for example, automatically according to the monitoring plan, and/or manually predefined.

The monitoring may be performed by the respective connector locally installed in each of the different data processing systems.

The monitoring may be performed by anchoring a multi-dimensional anchor template to the data processing event. Alternatively or additionally, in response to detecting the data processing events, the multi-dimensional anchor template may be anchored to the detected data processing event.

The multi-dimensional anchor may define a stable and/or reusable configurations of legal context that can be attached ("anchored") to one or more processing events, and then used to generate regulatory anchor sets, Privacy Fingerprints and/or compliance decisions without personal data.

The multi-dimensional anchor may be implemented as a named, versioned multi-dimensional context object combining Legal, Contextual, and/or Risk and/or Technical dimensions, which the engine uses as a template when interpreting incoming Context Signals.

In some embodiments, monitoring is performed by one or more connectors installed in or associated with respective data processing systems. Monitoring may be implemented, for example, using one or more of the following approaches:

API gateway interception: the connector monitors API requests and responses at an API gateway or service mesh (e.g., by observing HTTP method, endpoint pattern, response code, payload size, and destination class).

- Application instrumentation: the connector is implemented as a library or agent in the application runtime and hooks into data access layers or outbound connectors.
- Database audit/log monitoring: the connector subscribes to database audit logs (e.g., query logs, slow query logs, row-count estimates) and maps operations to canonical operation codes (e.g., read/query/export/delete).
- Job scheduler observation: the connector monitors scheduled jobs and batch pipelines, including job names, DAG identifiers, runtime parameters excluding identifiers, and dataflow direction.
- Event bus subscription: the connector subscribes to an event stream to detect events of interest, while applying schema enforcement and PII rejection before forwarding.
- File egress monitoring: the connector detects file export operations (e.g., object storage writes to external buckets, SFTP transfers), including file type, destination classification, and size class.

In some embodiments, the connector (and/or the contextual metadata extraction process) collects execution and/or technical context signals as non-identifying classes (rather than instance identifiers), and/or provides such signals for anchor computation and/or convergence evaluation. Examples include: (i) runtime or workload type (e.g., long-running service class, batch job class, scheduled job class, ETL pipeline class); (ii) execution environment class (e.g., API-handled request class, job-scheduler-executed class, containerized workload class, virtual machine workload class, serverless function class); and (iii) network-topology signals such as network segment/zone classification (e.g., production segment class, analytics segment class, integration segment class, DMZ segment class) and/or egress-path classification (e.g., direct egress class, API gateway egress class, service-mesh egress class, secure proxy/CASB egress class). In some embodiments, the connector excludes or redacts instance-level identifiers (e.g., hostnames, container IDs, pod IDs, IP addresses, MAC addresses, user identifiers), such that the extracted signals remain non-identifying.

In some embodiments, monitoring includes generating an "event context envelope" that includes non-identifying context signals and excludes payload fields that may include personal data. In some embodiments, the connector is configured to emit an event record when a monitored event matches the monitoring plan (e.g., matches selected endpoint patterns, selected job signatures, selected object types, and/or exceeds thresholds).

A data processing event may include an operation that, for example, accesses, moves, transforms, exports, shares, deletes, and/or otherwise processes data objects that may include personal data, and/or that is regulated by a privacy policy and/or jurisdictional rules. Examples of monitored data processing events include:

- Outbound export events: generation of a CSV/JSON export, report export, or data extract from a customer relationship management system (CRM), marketing platform, support system, or billing system.
- Third-party sharing events: invocation of an integration connector, webhook delivery, or API call that transmits data to an external vendor endpoint (e.g., advertising platform, email service provider, data enrichment provider).
- Cross-border transfer events: data transfer to a destination region that differs from a jurisdiction inferred from the contextual metadata, such as transfer from an EU-located controller environment to a non-EU storage bucket or SaaS endpoint.
- Bulk read/mass query events: batch read jobs, scheduled extract-transform-load (ETL) jobs, or database queries exceeding a volume threshold (e.g., row count, bytes transferred) or rate threshold.
- Account or employee record access events: reading, updating, or exporting HR records, payroll records, recruiting records, or employee performance records, including data processing events initiated by HR workflows.
- Analytics and profiling events: execution of a behavioral analytics query, feature extraction pipeline, audience segmentation job, or model scoring job that uses behavioral or tracking categories.
- Machine learning training events: initiation of a training job that consumes regulated datasets, for example a "train model" pipeline run, a feature store materialization, or embedding generation.
- Deletion and retention enforcement events: scheduled deletion tasks, retention purge jobs, deletion API calls, and/or failure events indicating that deletion could not be completed.
- Access control override events: privileged access sessions, "break-glass" events, or access grants for sensitive datasets.
- Consent state change events: updates to consent flags or preferences in a consent management system, marketing preference center, or customer portal.
- Data classification or tagging events: assignment or change of data-category labels in a catalogue or data governance tool, where the classification impacts downstream processing permissions.
- Data synchronization events: synchronization tasks between internal systems (e.g., CRM-to-data-warehouse sync) and between internal and external systems (e.g., CRM-to-email-vendor sync).

In some embodiments, the monitoring plan generated during the bootstrap phase (FIG. 2, act 202) identifies the event types, endpoints, job signatures, and/or data object types to monitor, including sampling rules, thresholds, and prioritization.

In some embodiments, the system operates on a per-event basis such that, for each detected data processing event, a regulatory anchor set is computed as an event-level representation of regulatory state, and the deterministic reasoning engine performs deterministic evaluation on the regulatory anchor set to produce a compliance determination. In some embodiments, a per-event non-identifying compliance/verification token (NICT) is always generated for each monitored event, irrespective of whether any cross-system linkage is performed. Convergence (event linkage across multiple systems) is a separate and optional process used to determine whether multiple events correspond to a common logical processing activity. A privacy fingerprint, when generated, is a derived aggregation artifact computed from one or more per-event regulatory anchor sets (and/or their state anchors) for cross-event context and audit analytics, and does not replace the per-event anchor evaluation and per-event NICT generation.

In some embodiments, the connector extracts, as part of the contextual metadata (e.g., technical-context signals), operating-system and runtime execution signals expressed as non-identifying classes, and not as user-specific or host-instance identifiers. Exemplary non-PII classes include: operating system family/class (e.g., Linux family, Windows Server family), runtime/deployment substrate class (e.g., Kubernetes, virtual machine, bare metal, serverless), container/workload class (e.g., batch job workload class versus long-running service class; namespace class), host class (e.g., production application host class, analytics host class, integration host class), process or service-account class (e.g., ETL service principal class, marketing automation service class), and scheduler identity class (e.g., Kubernetes CronJob class, Airflow scheduler class, CI/CD runner class). The connector is configured to exclude or redact instance-level identifiers (e.g., hostnames, pod IDs, container IDs, IP addresses, MAC addresses, usernames, and tokens), such that the transmitted signals provide execution context for anchor computation and/or convergence scoring without including personal data.

At 206, contextual metadata associated with the data processing event is provided, for example, extracted, and/or accessed. The contextual metadata may be obtained, for example, by each respective connector. Each respective connector may send its respective contextual metadata to the server.

The contextual data may be extracted by the respective connector locally installed in each of the different data processing systems. The extracted contextual metadata may be sent to the server by each respective connector.

In some embodiments, the connector extracts contextual metadata via configured adapters for each source system. For example, in a CRM system, extraction may be based on audit events indicating "export report" and the export destination class. In an ETL pipeline, extraction may be based on job metadata such as pipeline name, source/destination connectors, and scheduling context. In an API gateway, extraction may be based on endpoint pattern classification and egress destination classification.

In some embodiments, the connector explicitly omits and/or removes payload content and fields that may include personal data. In some embodiments, extracted fields are further validated by the signal validation layer described herein to reject PII patterns and/or reject the entire request upon detection.

The contextual metadata may be implemented as candidate contextual metadata, which is to be further processed to help ensure that data identifiable with one or more specific entities (e.g., humans, such as users). is excluded. The contextual metadata may itself be selected to exclude data identifiable with one or more specific entities. The filtering may be an extra precaution step. Alternatively, the contextual metadata may include identifiable with one or more specific entities, which is then processed to remove the identifiable with one or more specific entities.

The contextual metadata may also be referred to herein as contextual multi-signal input or contextual signals. The contextual data may be implemented as a contextual multi-signal representation of processing context devoid of personal identifiers. The contextual multi-signal input may be implemented as a data-structure for representing processing events using contextual metadata rather than personal data.

The contextual metadata may be implemented as non-identifiable context.

The contextual metadata may be extracted and/or accessed by respective connectors.

The contextual metadata may be pre-processed by respective connectors. The pre-processed contextual metadata may be sent to the server by the respective connectors. Alternatively, the contextual metadata is sent to the server by the respective connectors, for pre-processing by the server.

The contextual metadata may be dynamically extracted and/or accessed, including real-time data.

In some embodiments, the contextual metadata and/or technical-context state anchor further includes host-level and runtime-level execution signals, provided that such signals are non-identifying and do not include personal data. Exemplary execution signals include: an operating system class (e.g., Linux distribution family, Windows Server family), a runtime type or deployment substrate (e.g., Kubernetes, virtual machine, bare-metal host, serverless runtime), a container/workload class (e.g., namespace class, workload type such as batch-job versus long-running service, or a pod/deployment class), a host class (e.g., production application host versus analytics host versus integration host), a process class and/or service-account class (e.g., batch service principal class, ETL service class, marketing automation service class), and a scheduler identity class (e.g., Airflow scheduler class, Kubernetes CronJob class, CI/CD runner class). Such execution signals may be used, for example, to compute or refine operation anchors, technical-context anchors, anomaly anchors, and/or convergence confidence, while excluding identifiers such as usernames, device identifiers, IP addresses, MAC addresses, and workload instance IDs.

In some embodiments, the contextual metadata and/or the technical-context state anchor further includes Network Context Signals that describe a network-level context of the data processing event in a non-identifying manner. Exemplary Network Context Signals include one or more of: an egress path class (e.g., direct internet egress, via API gateway, via service mesh, via secure egress proxy), a network zone/segment class (e.g., production segment, analytics segment, integration segment, DMZ segment), a segment adjacency classification (e.g., intra-segment, inter-segment, segment-to-DMZ), a topology hop-count bucket (e.g., 1 hop, 2-3 hops, >3 hops), a destination network class (e.g., internal VPC/VNet, partner network, public SaaS network), a peering/transit classification (e.g., private peering, VPN, public internet), an egress control class (e.g., DLP-inspected egress, CASB-inspected egress, uninspected egress), and/or a destination region class (e.g., EU region class, US region class) without including IP addresses, MAC addresses, device identifiers, or endpoint-specific identifiers.

The contextual metadata may include data from one or more data sources, for example:

- Operation telemetry (e.g., export/batch/query).
- System characteristics (e.g., system type, process).
- Execution context (e.g., runtime context).
- Internal policy status (e.g., retention class, consent status).
- Aggregate statistics (e.g., volume rate, anomaly score).
- Pre-stored data (e.g., ontology, policy catalogs, mapping dictionaries).
- API gateway telemetry (e.g., method, endpoint class, bulk/export signals).
- Job scheduler logs (e.g., batch/export jobs).
- Integration registry (e.g., destination class and vendor class).
- Network egress categorization (e.g., external API vs internal).
- Time bucket+environment (e.g., prod/stage).
- Baselines from aggregate stats (no IDs).

In some embodiments, the connector extracts candidate contextual metadata associated with each monitored data processing event. Candidate contextual metadata may include non-identifying contextual signals that represent the processing circumstances. Examples of candidate contextual metadata include:

- system origin signals: system identifier, system type (CRM/HR/analytics), environment (prod/stage), connector identifier;
- operation signals: operation family (export/read/write/delete), endpoint class, job type, scheduler identifiers, network flow direction (inbound/outbound/internal);
- purpose signals: declared purpose code, workflow name, feature flag indicating marketing/analytics/fraud/compliance;
- jurisdictional context signals: controller locus, deployment region, configured processing territory, data residency configuration, destination region class;
- data category signals: data object type category (e.g., CONTACT_DATA, FINANCIAL, HR), inferred by bootstrap profiling and/or field/object naming;
- consent/permission signals: consent-state indicator provided by the source system policy engine (valid/expired/withdrawn/not required/unknown), where the connector does not transmit identifiers;
- retention signals: retention policy code, time-to-live class, created_at bucket, and/or expiration timestamp;
- volume and telemetry signals: count buckets, size buckets, rate buckets, anomaly scores derived from aggregates;
- transfer boundary signals: destination class (internal/third party/cross-border), third-party Boolean, cross-border Boolean.

An example of the candidate contextual metadata is as follows: {"purpose_code": "MARKETING_EMAIL", "jurisdiction": "EU_DE", "data_category": ["C ONTACT_ DATA" ], "processing_mode": "SEND", "consent_state": "VALID", "system_orig in": "crm_marketing", "event time": "2025-11-18T12:41Z" }

At 208, the candidate contextual metadata may be preprocessed, for example, by filtering to generate contextual metadata excluding data identifiable with at least one specific identity. Personal information may be rejected.

As used herein, candidate contextual metadata may refer to extracted pre-filter contextual metadata.

The contextual data may be pre-processed by the respective connector locally installed in each of the different data processing systems and/or by the server that receives the candidate contextual metadata from the connectors.

The filtering may be implemented, for example, against a predefined schema to reject fields matching patterns correlated with identifiable data, such as string. The predefined schema may be implemented as a data object, including for example: allow listed field names/types, regex/pattern list, per-field actions (drop vs. reject), max length thresholds, and/or version id. Examples of fields to exclude include: email address (@), phone number (^\+?[0-9]), name (e.g., including spaces with capital letters such as "John Doe"), device identifier, cookies, pseudonym, network addresses (e.g., complying with IPv4 and/or IPv6 formats), and hashed identifiers (e.g., SHA-256 length and/or hex);

One or more fields resembling personal data (e.g., by detecting a pattern) may be removed and/or rejected.

The monitoring and/or extraction of the metadata and/or the filtering may be implemented by, for example, the controller, the server, and/or other components.

The pre-processing may be implemented by a signal validation layer. The signal validation layer may be designed to implement one or more of. Enforce strict schema (e.g., only legal-context fields allowed), detect potential PII patterns (e.g., regex+semantic rules), reject the entire request if any identifier appears, and/or add ingestion metadata (e.g., non-personal).

The following are exemplary PII detection rules: strings matching RFC-5322 email, E.164 phone number pattern, hash-length+hex format (e.g., to block pseudonymized identities), name patterns (e.g., two capitalized tokens), IPv4/IPv6 patterns, and/or known formats (e.g., Firebase ID, GA User ID, UID2, MAIDs, IDFA). If detection=true→immediate hard fail (HTTP 400).

At 210, a regulatory anchor set is dynamically computed for the data processing event based on the contextual metadata. Each regulatory anchor set is computed at an event-level. A respective regulatory anchor set is dynamically computed for each monitored data processing event. Multiple regulatory anchor sets are dynamically computed for multiple monitored data processing events. The regulatory anchor set includes one or more state anchors. Each state anchor may indicate a dynamic state computed based on current operation and/or current context.

In some embodiments, the regulatory anchor set is the regulatory decision substrate computed on a per-event basis and is the primary input evaluated by the deterministic reasoning engine to generate a per-event compliance determination. In such embodiments, a privacy fingerprint, when generated, is a derived aggregation artifact computed from one or more per-event regulatory anchor sets (and/or their state anchors) to represent cross-event context, to support analytics and audit reporting, and/or to provide consolidated explanation for a converged logical processing activity. Accordingly, privacy fingerprint generation is optional and does not replace per-event anchor computation, per-event deterministic evaluation, or per-event NICT generation.

In some embodiments, regulatory anchors incorporate non-identifying network context signals, including destination class, communication path type, integration interface class, and network boundary indicators. Such signals may reflect, for example, whether an event involves internal communication, third-party interaction, file transfer, or cross-border transmission.

Network context signals may be used as part of convergence scoring and regulatory evaluation, without reliance on network addresses, routing identifiers, or personal data.

The regulatory anchor set may be computed, for example, by each connector, at the server, and/or in a hybrid implementation including computation by the connector and the server.

The regulatory anchor set is designed to be non-identifying of a specific personal identity, not derived from attributes of the specific personal identify, and/or is designed to be non-reversible for identification of the specific personal identity.

The multi-dimensional anchor, which may be anchored to the data processing event (e.g., to each respective data processing event) may be used to generate state anchors of different types, which may be combined into the regulatory anchor set.

The multi-dimensional anchor template may include a legal dimension defines the legal meaning of the processing in a given jurisdiction. I.e., what the law requires and/or allows. The legal dimension may represent the primary input into the regulation-aware reasoning engine. The legal dimension includes one or more of:

- Jurisdiction and/or jurisdictional requirements (e.g., jurisdiction (e.g., EU_DE, EU_IE, US_CA).
- Consent requirements (e.g., Boolean).
- Candidate legal bases (e.g., ["CONSENT" ], ["LEGAL_OBLIGATION", "LEGITIMATE_INTEREST" ])
- Default legal basis (preferred basis if conditions are met).

Retention policies, such as retention policy code (e.g., RET_MARKETING_24M, RET_FRAUD_72M)

regulatory modifiers (optional flags like "CHILDREN_DATA", "CROSS_BORDER_REQUIRES_SCC")

The multi-dimensional anchor template may include a contextual dimension that describes the operational context of the processing. I.e., what the entity (e.g., organization) is actually doing. The contextual dimension may be used to help ensure that similar situations (e.g., "EU newsletter marketing") map to the same anchor across different data processing systems. The contextual dimension may include one or more of:

purpose codes (e.g., MARKETING_NEWSLETTER, FRAUD_INVESTIGATION, HR_PAYROLL)

data categories (e.g., ["CONTACT_DATA", "BEHAVIORAL_EVENT" ])

anchor_type_id (high-level category: AT_MARKETING_EMAIL, AT_FRAUD_DETECTION. AT_HR_PAYROLL)

processing actions or event types (e.g., SEND_EMAIL, FRAUD_ANAL, HR_DATA_PROCESSING)

system_scope (optional list of systems: ["crm_marketing", "fraud_engine" ]).

A risk dimension (e.g., risk and technical constraints dimension) indicating base risk scores, risk factors and technical constraints. The risk and technical constraints dimension may define the risk posture and mandatory safeguards for that context. I.e., how risky this processing is, and what safeguards are mandatory. The risk dimension may enable the reasoning engine to adjust decisions depending on risk and/or output conditions (e.g., "only allowed if access control and logging are enforced"). The risk dimension may include one or more of:

base_risk_score (0.0-1.0)

risk_factors (e.g., ["TRACKING", "FINANCIAL_DATA", "CROSS_PLATFORM_ANALYSIS" ])

risk_modifiers (rules like "IF includes CHILDREN_DATA THEN risk=HIGH")

technical_constraints (e.g., ["LOGGING REQUIRED", "HUMAN_REVIEW_FOR_HIGH_RISK", "NO_THIR D_PARTY_EXPORT" ])

The multiple dimensions of the anchor template may include metadata about processing, excluding data about individuals.

Referring now back to FIG. 4, table 402 presents exemplary anchor types. An anchor type may represent a high level category of the anchor. The anchor type may be defined using the following exemplary data structure: anchor_type_id string (PK), name string, description text, default_risk_level enum ("LOW", "MEDIUM", "HIGH"), created_at datetime, updated_at datetime).

Referring now back to FIG. 2, at 210, the anchor may represent the actual multi-dimensional anchor data structure (e.g., object). For example, each row denotes a single anchor with multiple dimensions embedded.

Referring now back to FIG. 5, first anchor 500 is for a European Union (EU) newsletter marketing. The following are exemplary fields of first anchor 500, presented as a table:

anchor_id string (PK)
anchor type_id string (FK→anchor_types)
version int
status enum ("ACTIVE", "DEPRECATED", "DRAFT")
Legal Dimension
jurisdiction string
requires_consent Boolean
candidate_legal_bases json/array of strings
default_legal basis string
retention_policy_code string
regulatory_modifiers json/array of strings
Contextual Dimension
purpose_code string
data_categories json/array of strings
processing_actions json/array of strings
system_scope json/array of strings (optional)
Risk & Technical Dimension
base_risk_score float
risk_factors json/array of strings
risk_modifiers json/array (rules or descriptors)
technical_constraints json/array of strings
Meta
created_by string
created_at datetime
updated_at datetime Referring now back to FIG. 6, first anchor 600 is for a Cross-Platform Fraud Detection (EU). First anchor 600 is based on the fields of the table presenting first anchor 500 of FIG. 5.

Referring now back to FIG. 7, examples of anchor mappings 700 are provided.

In some embodiments, the anchor mappings 700 of FIG. 7 are not static. Rather, the system may adaptively update one or more mappings based on feedback signals and/or monitoring outcomes, for example as part of an adaptive monitoring and/or feedback state anchor (e.g., Anchor #14). By way of example, when evidence quality flags indicate degraded signal quality, when drift or anomaly anchors indicate a change in operational behavior, and/or when repeated conditional/blocked decisions are attributable to mismapped context signals, the system may update mapping rules, priorities, and/or pattern fields (e.g., jurisdiction_pattern, purpose_code_pattern, data_category_pattern) and version such updates, while maintaining audit logs of mapping changes. Such adaptive updates may be performed automatically subject to administrative approval, or automatically within predefined bounds, to improve mapping accuracy over time without requiring the ingestion of personal data.

Anchor mappings define how incoming Context Signals are mapped to anchors, for example, using rules that map context signals to corresponding anchor data structures. Anchor mappings 700 are presented as a table, which may include the following exemplary fields:

mapping_id string (PK)
tenant_id string
source_system string
event_type string
jurisdiction_pattern string
purpose_code_pattern string
data_category_pattern json/array or pattern
anchor_id string (FK→anchors)
priority int
status enum ("ACTIVE", "INACTIVE")
created_at datetime
updated_at datetime Referring now back to FIG. 2, at 210, a type of the multi-dimensional anchor template may be selected from multiple multi-dimensional anchor templates of different types of templates.

The multi-dimensional anchor templates may be stored in an anchor repository. Each multi-dimensional anchor template may be versioned and associated with at least one of the following exemplary and not necessarily limiting fields:

an anchor type identifier, a jurisdiction pattern, a purpose code pattern, and a data category pattern.

The selection may be performed by selection criteria applied to the contextual metadata. For example, the selection may be performed by:

A set of rules applied to the contextual metadata that map to the type of anchor template.

By feeding the contextual metadata into a trained classifier that outputs the type of anchor template as a classification category (e.g., trained on a training dataset of context data labelled with a ground truth label of the type of anchor template), and the like.

Matching the contextual metadata against the jurisdiction pattern, purpose code pattern, and/or data category pattern of each anchor template. Each match may be assigned a score. The multi-dimensional anchor template with highest priority among matching templates is selected.

The regulatory anchor set may be resolved (e.g., computed) by instantiating the selected multi-dimensional anchor template with values from the context metadata.

Optionally, in implementations in which the data processing system(s) includes multiple different heterogeneous data processing systems, a normalization engine (e.g., implemented within a context normalization layer) may perform processing for normalization of the contextual data obtained from the heterogeneous data processing systems.

Optionally, different fields of the heterogeneous data processing systems may be mapped to canonical verification-context signals for performing semantic normalization of multi-source contextual data by the normalization engine. The regulatory anchor set may be computed based on the canonical verification context-signals.

The normalization engine may perform semantic normalization of multi-source contextual data. The normalization engine may map arbitrary system fields to canonical legal-context signals.

For example:

purpose→purpose_code
region→jurisdiction
flag→consent_state
operation→processing mode
dataset→data_category The normalization engine may convert heterogeneous signals into a canonical Context Signal format. The following are exemplary normalization steps implemented by the normalization engine:

map purpose_label→purpose_code
map region→jurisdiction
map flags→consent_state
infer data_categories
infer processing_mode
validate timestamp Output: A fully normalized Context Signal including (only) legal context.

Referring now back to FIG. 8, table 800 depicts some exemplary state anchors. Table 800 includes an anchor name 802, anchor description 804, examples of variables (with possible values) 806, variable descriptions (concise) 808, and purpose and advantage versus metadata and competitors 810.

Additional details of exemplary state anchors are now described.

A first exemplary state anchor is implemented as a purpose anchor. The purpose anchor may compute the effective purpose of the data processing event as a probability distribution over canonical purpose, and/or may select a normative purpose_band. The purpose anchor is designed to reduce risk of and/or prevent purpose spoofing and/or detect purpose drift (e.g., function creep) using non-identifying context signals. The purpose anchor may transform static purpose metadata into a computed state per event with confidence and drift. The purpose anchor may be designed to implement one or more of: robust against mislabeling, support deterministic legal evaluation, provide auditable non-PII trace, and/or enable drift detection.

The purpose anchor may be computed by the following exemplary process. Extracting a feature vector from the contextual metadata. Applying a multi-signal purpose classifier to generate a purpose probability distribution over multiple canonical purpose classes. Selecting a purpose band based on the purpose probability distribution. Computing a confidence score based on a maximum probability value and/or a quality coefficient derived from signal completeness.

Computing a purpose drift measure by calculating a divergence between the purpose probability distribution and a baseline purpose distribution for similar events.

The following are exemplary variables of the purpose anchor which are computed per data processing event:

1) x_purpose[K]

Description: Probability distribution over purposes.

Purpose: Quantitative basis for deterministic rules, drift tracking, and explainability.

Computation: softmax over a weighted sum of feature-family scorers.

Formula:

$$z = \sum_{i=1}^{n} w_i \cdot f_i(\phi(e)),\ x_{purpose} = \text{softmax}(z)$$

e: event context envelope (no PII)

ϕ(e): feature vector extracted from context signals $f_i$: feature-family scorer (e.g., op/purpose compatibility, destination/purpose compatibility)

$w_i$: weights for each feature family $$\text{softmax}(z_k) = \frac{e^{z_k}}{\sum_j e^{z_j}}$$

Possible values: vector length K (e.g., 6), each ∈[0,1], sum=1.

2) purpose band

Description: Selected purpose class.

Purpose: Stable categorical input for policy rules.

Computation: argmax over the probability vector.

$$\text{purpose\_band} = PurposeMap\left(\underset{k}{\text{argmax}}\, x_{purpose}[k]\right) \quad \text{Formula}$$

Possible values: {MARKETING, SALES, HR, SUPPORT, COMPLIANCE, UNKNOWN}

3) conf

Description: Confidence in the inference.

Purpose: Conservative escalation when signals are incomplete or inconsistent.

Computation: top probability multiplied by a quality coefficient.

Formula:

$$conf=\max(x_{purpose})\cdot PCC$$

PCC (Policy/Context Consistency Coefficient) is computed from quality gates:

schema validity, completeness, signal consistency.

Possible values: [0,1]

4) drift

Description: Drift vs baseline (prior distribution for similar events).

Purpose: Detect evolving behavior inconsistent with declared purpose.

Computation: KL divergence from baseline.

$$drift = D_{KL}(x_{purpose}\|x_{baseline}) = \sum_k x_{purpose}[k]\ln\frac{x_{purpose}[k]}{x_{baseline}[k]}$$ Formula Possible values: ≥0

5) top contributors

Description: Explainability structure listing main feature contributors.

Purpose: Auditability without PII.

Computation: sort feature-family contributions $|w_i f_i|$.

6) quality flags

Description: Evidence quality indicators.

Purpose: Downstream gating (e.g., require review when degraded).

Possible values: set of codes (e.g., SCHEMA_OK, SIGNALS_OK, LOW_EVIDENCE, DEGRADED)

Optionally, a second exemplary state anchor is implemented as an operation anchor. The operation anchor may encode a canonical operation code.

The operation anchor may be computed by the following exemplary process. Extracting operation signals from the contextual metadata including at least one of the following exemplary and not necessarily limiting fields: API endpoint patterns, database operation types, job scheduler metadata, and network flow direction. Applying a multi-signal operation classifier to generate an operation probability distribution over canonical operation codes. Selecting a canonical operation code from the following exemplary and not necessarily limiting fields: read, query, write, update, delete, export, share, and sync. Computing an operation confidence score and an operation drift measure.

Optionally, a third exemplary state anchor is implemented as a sensitivity anchor. The sensitivity anchor may encode an event sensitivity score and/or sensitivity band. The sensitivity score may indicate likelihood of the respective processing event including personal data which is to be excluded. The score may be assigned, for example, from 0 to 1, or 0 to 10, or other values, where 0 may indicate no sensitivity (e.g., excludes personal data) and 1 indicates high sensitivity (e.g., most likely includes personal data). Alternatively, the sensitivity band may represent a classification category indicating likelihood of including sensitivity data, for example, low, medium, high, and the like.

Optionally, a fourth exemplary state anchor is implemented as a transfer boundary anchor indicating whether the event crosses a boundary. The transfer boundary anchor may encode at least one of: a boundary classification, a third-party boundary; a cross-border boundary, a destination boundary (e.g., class), and a geographic destination boundary (e.g., identifier). The boundary classification may be selected from, for example: internal, internal ETL, to third party, cross-border, and unknown. Crossing a boundary may be associated with processing of personal data which is to be excluded.

Optionally, a fifth exemplary state anchor is implemented as a jurisdiction anchor indicating a jurisdiction. The jurisdiction may be represented as, for example, a country, a state, a city, a corporate specific jurisdiction, a virtual jurisdiction, and the like. The jurisdiction anchor may encode at least one of: a primary jurisdiction identifier, at least one secondary jurisdiction identifier, a controller locus identifier, and a subject locus identifier. Each jurisdiction may be associated with its own privacy policy which is to be complied with by the data processing event.

Optionally, a sixth exemplary state anchor is implemented as a lawful basis anchor indicating lawful basis candidates. The lawful-basis anchor may encode a lawful basis selected from the following exemplary and not necessarily limiting values: consent, contract, legal obligation, vital interests, public task, and legitimate interest. The consent may include a consent state selected from, for example: valid, expired, missing, withdrawn, not required, and unknown. The lawful-basis anchor may include a list of constraint codes specifying conditions that must be satisfied for the data processing event to comply with the privacy policy.

An example of generation of the lawful basis anchor is now provided. The input contextual metadata includes; purpose_code, role_context, jurisdiction, consent_state, sensitivity. The generated lawful basis anchor includes: lawful_basis_state={candidate basis[ ], active_basis, confidence, required_conditions}. The deterministic reasoning engine may use evaluation logic to checks conditions over vector components, for example:

If jurisdiction=EU AND category=sensitive AND consent_state!=valid⇒block/conditional If retention_expired⇒block If export_to_third_party AND safeguards missing⇒conditional Optionally, a seventh exemplary state anchor is implemented as a retention anchor and/or expiration anchor indicating whether retention is expired. Data may be retained for a predefined amount of time, and/or until a predefined condition is met. The retention may be evaluated at the time during which the data processing event occurred. The retention anchor may encode one or more of: an allowed time-to-live value, an age value representing time elapsed since data creation, an expiration Boolean indicating whether retention has expired, a retention band (e.g., selected from: active, near expiry, expired, and unknown), and/or a deletion capability classification indicating whether the data processing system supports automated deletion.

Optionally, an eighth exemplary state anchor is implemented as a risk and/or safeguards anchor indicating a risk score. The risk score may indicate risk of leakage of personal data. One or more safeguards may be implemented according to the risk score. For example, increasingly secure safeguards may be implemented with increasing values of the risk score, such as within ranges and/or greater than corresponding thresholds.

The risk anchor may be computed by the following exemplary process. Computing a sensitivity score based on a category exposure multiplier derived from data categories in the contextual metadata, and/or a volume escalation effect derived from processing volume metrics. Determining a transfer boundary classification indicating whether the data processing event crosses at least one of: an internal boundary, a third-party boundary, and a cross-border boundary (which may be obtained from the boundary anchor). Applying a risk model to the sensitivity score and/or the transfer boundary classification to generate the risk score. Determining required safeguards based on the risk score and jurisdictional requirements.

Optionally, a ninth exemplary state anchor is implemented as a behavioral pattern and/or anomaly anchor indicating anomalous patterns. The anomalous pattern may be detected, for example, using a set of rules, analysis of extracted features, a specialized machine learning model, and the like. Anomalous patterns may indicate leakage of personal data.

Optionally, a tenth exemplary state anchor is implemented as a convergence confidence anchor indicating a common processing context. The convergence confidence anchor may be computed for each processing event, to determine if the different convergence confidence anchors of the different processing event are different aspects of and/or relate to a common processing event.

Optionally, an eleventh exemplary state anchor is implemented as a legal explanation and/or decision trace anchor indicating deterministic decision trace.

Optionally, a twelfth exemplary state anchor is implemented as a provenance evidence chain anchor indicating provenance.

Optionally, a thirteenth exemplary state anchor is implemented as a technical context and/or execution environment anchor encoding execution context. The technical context anchor may encode at least one of: an execution mode, a data flow direction; and an integration type. The execution mode may be selected from: API call, batch job, export job, sync task, and ETL pipeline. The data flow direction may be selected from: inbound, outbound, and internal. The ETL pipeline may be selected from: native, custom API, SaaS, and file export.

Optionally, a fourteenth exemplary state anchor is implemented as an adaptive monitoring and/or feedback state anchor implementing closed-loop monitoring.

At 212, one or more privacy fingerprints (PF) data structures (also referred to herein as PF) may be computed.

In some embodiments, a distinction is maintained between a regulatory anchor set and a privacy fingerprint. The regulatory anchor set may represent the event-level regulatory state computed for a particular data processing event (e.g., purpose state, jurisdiction applicability, lawful basis state, retention state, transfer boundary state, and risk/safeguards state), and/or may constitute the primary decision basis used by the deterministic reasoning engine to generate a compliance determination. The privacy fingerprint may be a non-identifying aggregation artifact derived from one or more regulatory anchor sets, for example, to fuse context across multiple related events and/or across multiple source systems, and may be used to support cross-event compliance analytics, audit reporting, and explainability without requiring access to personal data.

In some embodiments, no PF is computed, and the method proceeds to 214. For example, the flow may be: event→anchor set (per event)→deterministic reasoning engine→NICT (per event). Alternatively, in some embodiments, fingerprints are computed. PFs may be computed in response to convergence being detected (e.g., two or more cross-system related events). The flow may be: aggregated/cluster privacy fingerprint→(optional) Unified NICT, while still maintaining per-event NICTs.

The PF may be computed by the server.

Each privacy fingerprint(s) exclude personal data.

Each PF may reference a single multi-dimensional anchor, multiple anchors such as a regulatory anchor set, or multiple regulatory anchor sets such as corresponding to a common data processing event.

Optionally, a respective PFis computed for a single processing event. The respective PF may be computed based on the set of regulatory anchors corresponding to the single processing event. Alternatively, fingerprints may be generated when multiple events are determined to correspond to the same logical processing activity, which may span multiple data processing systems. In some embodiments, multiple data processing events—possibly generated by different systems—that are related to a common underlying processing activity (also referred to herein as a "common event" or "logical processing activity"), are detected. A respective PF may be computed for multiple processing events which are converged, that correspond to a common processing event, which may include a logical processing activity spanning multiple observed data processing events. The respective PF may be computed based on the multiple sets of regulatory anchors corresponding to the converged processing events, corresponding to the common processing event.

The convergence process may be implemented as a distinct determination mechanism that decides whether events belong to the same processing activity, is separate from the deterministic compliance reasoning engine, and/or is logically implemented prior to fingerprint generation. Convergence may represent a decision boundary for generation of PFs. The convergence process may be implemented by the convergence engine based on contextual similarity and/or regulatory anchor similarity, without using personal identifiers.

In some embodiments, a convergence engine (also referred to herein as an event linkage engine) determines whether two or more monitored data processing events belong to a same logical processing activity, without use of personal identifiers. The convergence engine processes non-identifying, anchor-derived features and may produce a convergence confidence score used to suppress false convergence and/or trigger generation of an aggregated privacy fingerprint for cross-event context and audit analytics.

In some embodiments, a convergence engine determines whether two or more detected data processing events correspond to a same logical processing activity without use of personal identifiers. The convergence engine evaluates inputs including one or more of: (i) anchor-derived features from the per-event regulatory anchor sets (e.g., purpose band, jurisdiction, transfer boundary/destination class, operation family, data category/sensitivity, and risk factors), (ii) temporal proximity features (e.g., timestamps, time deltas, and satisfaction of a configurable time window), and (iii) technical and network context features expressed as non-identifying classes (e.g., system class, execution mode, egress-path class, network segment/zone class, and destination network class). The convergence engine may perform an evaluation by computing a weighted similarity score across the feature sets, optionally combined with temporal alignment and a connector reliability coefficient, to yield a convergence confidence. The convergence engine may make a decision by asserting convergence when the confidence exceeds one or more configurable thresholds, and/or by applying suppression rules to avoid false convergence, for example by requiring mandatory compatibility of selected features (e.g., jurisdiction and transfer-boundary compatibility) and suppressing convergence when required features are unknown, inconsistent, outside the time window, and/or below a confidence level.

Optionally, for each event, the convergence engine derives a feature set from the regulatory anchor set and technical metadata, for example including one or more of: (i) purpose band (and optionally purpose confidence/drift), (ii) jurisdiction identifier(s), (iii) transfer boundary state (e.g., internal/third party/cross-border, destination class), (iv) operation/processing action family and execution mode (e.g., API vs batch vs export vs sync), (v) data category set and/or sensitivity band, (vi) risk factor set and/or risk score band, and (vii) technical context (e.g., system class/origin and environment). The feature set may further include temporal features such as timestamps and time deltas between events.

In some embodiments, event pairs are considered for convergence if they occur within a time window (e.g., seconds to minutes). One or more match gates may be applied before scoring, for example requiring: (i) jurisdiction match (or configured jurisdiction compatibility), and (ii) transfer boundary match (e.g., both third-party and/or both cross-border within a compatible destination class). If a gate fails, convergence is suppressed for the pair.

When gating passes, a similarity score may be computed as a weighted combination of sub-similarities over the feature set, for example: [S=\sumk wk\cdot sim_k] where sub-similarities may include purpose similarity, jurisdiction similarity, transfer boundary similarity, operation similarity, data-category set similarity, risk-factor set similarity, and technical-context similarity.

In some embodiments, a convergence confidence score is computed as a function of similarity, temporal alignment, and connector reliability, for example: C=f(S,\Delta t,R) where (\Delta t) denotes time delta and (R) denote a connector trust coefficient (e.g., based on attestation/version and signal quality). Convergence is asserted when (C) exceeds a threshold, which may be configurable per tenant and/or per anchor type, and suppressed when evidence quality is degraded (e.g., unknown jurisdiction/transfer boundary or low purpose confidence).

In some embodiments, the convergence engine uses the Network Context Signals as part of the convergence similarity score and/or mandatory gating, for example by increasing similarity when two events share a same egress path class and/or destination network class, and suppressing convergence when network zone/segment classes are incompatible with a same logical processing activity (e.g., unrelated segments with no permitted adjacency), while still excluding personal data.

In some embodiments, the convergence engine computes, for a candidate pair (or set) of events, a similarity score as a weighted combination of sub-similarities derived from the regulatory anchor set and technical-context variables, including one or more of: purpose band, jurisdiction, transfer boundary state, operation family, data-category set, risk-factor set, technical context (system class/execution mode), and network context signals (e.g., egress-path class and destination network class), where set-based fields may be compared using a set-overlap metric (e.g., Jaccard similarity). A convergence confidence score is computed as a function of at least the similarity score and temporal alignment (e.g., time-delta within a time window), and optionally a connector trust coefficient reflecting signal integrity. In some embodiments, false positives are suppressed by mandatory gating rules requiring (i) jurisdiction match or configured jurisdiction compatibility, and (ii) transfer-boundary compatibility (e.g., both internal, or both third-party and/or cross-border within a compatible destination class), and by rejecting convergence when temporal alignment falls outside the time window or when required anchor values are unknown or below a confidence threshold.

In some embodiments, the convergence engine determines whether multiple per-event regulatory anchor sets correspond to a same logical processing activity without use of personal identifiers. For each event, the convergence engine derives a feature subset from the regulatory anchor set, including, for example: purpose band (and optionally purpose confidence), jurisdiction identifier(s), transfer boundary state (e.g., internal/third-party/cross-border and destination class), operation family and/or execution mode, data category set and/or sensitivity band, risk-factor set and/or risk score band, and technical-context variables (e.g., system class/origin and environment).

In some embodiments, the feature subset further includes network context features (Network Context Signals) such as egress-path class, network segment/zone class, segment adjacency classification, destination network class, and/or peering/transit class, excluding IP addresses and endpoint identifiers.

In some embodiments, a pairwise (or set-wise) convergence score is computed as a weighted similarity: [S(e_i, e_j)=\sum_k w_k\cdot sim_k(e_i,e_j)] where each (sim_k) compares a respective feature (e.g., exact match for jurisdiction; compatibility mapping for operation family; and set overlap for data category and risk-factor sets), and the weights (w_k) are configurable per tenant and/or per anchor type. In some embodiments, a reliability coefficient (R) is computed for each event (or connector) based on signal integrity and/or quality (e.g., schema compliance, connector attestation/version state, and completeness of required anchor values), and a convergence confidence (C) is computed as a function of similarity, temporal alignment, and reliability (e.g., (C=f(S,\Delta t,R))), where (\Delta t) is a time delta within a configured time window.

In some embodiments, false convergence is prevented by mandatory gating rules applied prior to scoring, including at least: (i) jurisdiction match (or configured compatibility), (ii) transfer-boundary compatibility (e.g., both internal, or both third-party and/or cross-border within a compatible destination class), and (iii) time-window satisfaction; when a gate fails, convergence is suppressed. In some embodiments, convergence is asserted when (C) exceeds a configurable threshold (theta), and is suppressed when required anchor values are unknown, inconsistent, or below a confidence level.

Some examples of convergence are now provided.

Example A: "Marketing Campaign Launch" Convergence (Multi-System)

In an exemplary embodiment, a single campaign launch may generate related events across multiple systems, such as:

a CRM exporting a marketing list, a marketing automation system sending emails, and an analytics system logging campaign attribution events.

The convergence engine may identify these events as belonging to a common marketing campaign processing activity based on similarity of purpose code, timing proximity, consistent processing action family (export/send/log), similar system scope, and shared jurisdiction context.

Example B: "Fraud Investigation Case" Convergence (Multi-System) In another exemplary embodiment, a fraud investigation may generate related events across a payment gateway, a case management system, and an analytics engine. Convergence may be detected based on shared fraud-related purpose codes, high temporal alignment, and anchor similarity (e.g., shared lawful basis candidates, similar risk factor sets, and common jurisdiction anchor).

Example C: "Data Subject Request Fulfillment" Convergence

In another exemplary embodiment, a DSAR (data subject access request) workflow may generate related events across multiple systems including support ticketing, identity verification, data warehouse retrieval, and export to a fulfillment channel. Convergence may be detected based on purpose codes indicating DSAR/COMPLIANCE, temporal alignment, and a technical-context pattern indicating "collect/report/export."

In some embodiments, once convergence confidence exceeds a threshold, the system merges regulatory anchor sets associated with the converged events into a privacy fingerprint that encodes a unified regulatory state for the common processing activity, and the reasoning engine generates a single NICT for the unified context and/or generates coordinated NICTs for each constituent event.

The PF may represent a non-identifying abstraction of the legal state of a processing event. The PF may be implemented as a non-identifying abstraction including multiple regulatory vectors representing the legal state of a processing event, fused from contextual multi-signals.

The PF may include one or more of:

Legal-state vector encoding at least one of: at least one candidate legal basis, a consent state indicator, a jurisdiction identifier, and a list of regulatory constraints.

Retention-state vector encoding at least one of: a retention policy code and an expiration timestamp.

Risk-state vector encoding: a risk score, a list of risk factors, and a list of required safeguards.

Technical context vector encoding at least one of: a system origin identifier, a processing action code, and a list of systems involved in the convergence.

Jurisdictional context vector encoding: at least one applicable jurisdiction.

The PF excludes (i.e., does not include) one or more (all) of: an identifier, a transform of identity, personal metadata, and/or user-level attribute.

The privacy fingerprint may be implemented to be one or more (or all) of the following: non-identifying, not derived from user attributes, and/or not reversible. The PF may be implemented as a legal-context model and/or legal context object. The PF is not a user model and/or is not a user profile. The PF may represent a data structure which is fed into the reasoning engine.

The privacy fingerprint may include encoded representations of regulatory conditions, for example, one or more of: legal-state vector(s), retention-state vector(s), and risk-state vector(s).

An example PF is as follows. The exemplary PF=abstracted representation of regulatory conditions:

{"pf_id": "fp_e328e . . . ", "purpose": {"code": "MARKETING_EMAIL", "requires_consent":tr ue}, "legal_state_vector": {"candidate_bases": ["CONSENT" ], "consent_state": "VALID", "p rocessing_territory": "EU_DE" }, "retention_vector": {"policy_code": "RET_24M", "expires at": "2027-11-18T00:00Z" },
"risk_vector": {"risk_score": 0.31, "factors": ["TRACKING_ALLOWED" ]}, "technical_cont ext": {"origin_system": "crm_marketing", "operation": "SEND_EMAIL" }}

Another example of a PF is as follows:

{"pf_id": "pf_0c38a19f . . . ", "purpose": {"code": "MARKETING", "requires_consent":true}, "legal_state": {"candidate_bases": ["CONSENT" ], "consent state": "VALID", "jurisdiction": "EU_DE" }, "retention_state": {"policy_code": "RET_24M", "expires_at": "2027-11-18T00:00:00Z" }, "risk_state": {"risk_ score": 0.32, "risk_factors": ["EMAIL_MARKETING" ]}, "technical_context": {"system_origin": "crm_marketing", "processing_action": "SEND_EMAIL" }}

The PF(s) may be automatically generated by a PF generator. The PF generator may be designed to apply ontology rules to the contextual signals, for producing legal-state, retention-state, and/or risk-state vectors. The PF generator may be designed to provide (or significantly reduce the risk) that the generated PF is not linkable to a person. The PF generator may be designed to provide (or significantly reduce the risk) that the generated PF includes (only) abstracted, legal meaning.

The following is an exemplary process for generation of the PF:

1. Load jurisdiction ontology.
2. Map purpose_code→purpose object.
3. Determine lawful-basis candidates.
4. Construct legal-state vector.
5. Retrieve corresponding retention policy.
6. Construct retention vector.
7. Calculate risk vector using risk model.
8. Merge into PF object.
9. Persist PF (non-identifiable).

The PF may be generated by using one or more of: purpose context, jurisdiction, consent requirements, legal basis candidates, retention rules, and/or risk models.

Optionally, an API is provided for automatically generating the anchor in response to an input of metadata. For example, the request fed into the API is {"tenant_id": "tenant_123", "source_system": "crm_marketing", "event_type": "SEND_EMAIL", "jurisdiction": "EU_DE", "purpose_code": "MARKETING_NEWSLETTER", "data_categories": ["CONTACT_DATA", "BEHAVIORAL_EVENT" ]}. The response from the API is: {"anchor_id": "ANC_MARKETING_NEWSLETTER_EU_V1", "version": 1}. A full anchor may be obtained from the API, for example: {"anchor_id": "ANC_MARKETING_NEWSLETTER_EU_V1", "anchor type_id": "AT_MARKETING_EMAIL", "version": 1, "status": "ACTIVE", "legal": {"jurisdiction": "EU_DE", "requires_consent":true, "candidate legal bases": ["CONSENT" ], "default_legal_basis": "CONSENT", "retention_policy_code": "RET MARKETING_24M", "regulatory modifiers": ["NO CHILDREN_UNDER_16" ]}, "context": {"purpose_code": "MARKETING_NEWSLETTER", "data_categories": ["CONTACT_DATA", "BEHAVIORAL_EVENT" ], "processing_actions": ["SEND_EMAIL" ], "system_scope": ["crm_marketing" ]}, "risk_and_technical": {"base_risk_score": 0.4, "risk_factors": ["TRACKING", "BEHAVIORAL_ANALYTICS" ], "risk modifiers": ["IF ADVERTISING_PARTNERS_USED THEN risk+=0.2" ], "technical_constraints": ["INCLUDE_UNSUBSCRIBE_LINK", "RESPECT_OPT_OUT_FLAGS" ]}}. Dimensional may be represented as nested objects (e.g., legal, context, risk and technical).

Optionally, a convergence engine detects multiple related data processing events across different data processing systems based on contextual similarity. For example, a contextual similarity metric may be computed, with the related data processing events detected when the metric is above a threshold. The contextual similarity metric may be computed, for example, as a Euclidean distance between encodings of the context metadata, correlation between context metadata, and the like. In another example, context from different data processing events may be clustered, where events associated with a certain cluster denote related events. A respective regulatory anchor set may be computed for each of the detected related data processing events to generate multiple regulatory anchor sets. A convergence confidence score may be computed for the multiple regulatory anchor sets based on at least one or combination of: an anchor similarity score comparing the anchor sets of the related events, a temporal alignment score measuring temporal proximity, and a cross-system reliability coefficient. In response to the convergence confidence score exceeding a threshold, the privacy fingerprint data structure may be generated. The PF may be computed by merging the regulatory anchor sets of related events, and structuring the merged regulatory anchor sets into at least one privacy fingerprint encoding verification data. The computed privacy fingerprint excludes personal data and personal identifiers.

An example of convergence for generating the PF is now described. CRM generates the event "export contacts". Database generates the event: "bulk read customers". SaaS integration generates the event: "sync to vendor X". Each event triggers generation of a corresponding anchor set. Contextual similarity (e.g., purpose, target, timing, technical context) may be identified between the events, triggering computation of: convergence_candidate_id and confidence score. When the confidence score exceeds a threshold, the privacy fingerprint may be computed for the events for which contextual similarity was detected. The NICT is generated at the unified processing context level, i.e., based on the fingerprint.

An example of generation of an anchor and corresponding PF is now provided. A marketing signal, which is an example of a Context Signal (excluding personal data), is extracted and/or generated: {"tenant_id": "tenant_123", "source_system": "crm_marketing", "event_type": "SEND _EMAIL", "jurisdiction": "EU_DE", "purpose_code": "MARKETING_NEWSLETTER", "data categories": ["CONTACT_DATA", "BEHAVIORAL_EVENT" ], "consent_state": "VALID", "timestamp": "2025-11-18T12:41:02Z" }. Anchor resolution is performed. Anchor mappings for this tenant and system may be identified: MAP_MARKET_EU_EMAIL_01→anchor_id=ANC_MARKETING NEWSLETTER_EU_V1. The anchor template is accessed. For example, full anchor rows for ANC_MARKETING_ NEWSLETTER_EU_V1, including multiple (e.g., three) dimensions. The privacy fingerprint is generated by combining:

- From Context Signals: consent_state, timestamp, and jurisdiction (if needed to override or specialize).
- From Anchor (multi-dimensions):
  - Legal Dimension→candidate bases, consent requirement, retention policy
  - Contextual Dimension→purpose, data categories, processing actions
  - Risk & Technical→base risk, risk factors, constraints The following PF is generated: {"pf_id": "fp_12345", "anchor id": "ANC_MARKETING_NEWSLETTER_EU_V1", "tenant_id": "tenant_123", "jurisdiction": "EU_DE", "purpose": {"code": "MARKETING_NEWSLETTER", "requires_consent":true}, "legal_state": {"candidate_bases": ["CONSENT" ], "default_legal_basis": "CONSENT", "consent_state": "VALID", "retention_policy_code": "RET MARKETING_24M" }, "context_state": {"data categories": ["CONTACT_DATA", "BEHAVIORAL_EVENT" ], "processing_actions": ["SEND_EMAIL" ], "source_system": "crm_marketing" }, "risk_state": {"base_risk_score": 0.4, "risk factors": ["TRACKING", "BEHAVIORAL_ANALYTICS" ], "technical_constraints": ["INCLUDE_UNSUBSCRIBE_LINK", "RESPECT_OPT_OUT_FLAGS" ]}, "timestamp": "2025-11-18T12:41:02Z" }

The generated PF is fed into the Regulation-Aware Reasoning Engine to produce the decision and/or explanation.

At 214, the regulatory anchor set is fed into a reasoning engine (e.g., deterministic reasoning engine) designed for verification of the privacy policy. The reasoning engine may verify the privacy policy by applying jurisdictional rules according to the regulatory anchor set. Alternatively, the PF is fed into the reasoning engine.

As used herein, reference to the reasoning engine processing the regulatory anchor set is to be understood as also referring to the reasoning engine processing the PF. Reference to the reasoning engine processing the PF is to be understood as also referring to the reasoning engine processing the regulatory anchor set.

Compliance determinations described herein may be produced by deterministic evaluation of regulatory anchors against defined rules and policies. Any artificial intelligence or language model components, where present, are used solely to assist in generating human-readable explanations or summaries and do not determine, modify, or override compliance decisions.

The reasoning engine may be operated by the server.

The reasoning engine may be designed based on a deterministic architecture, for example, using deterministic rules, performing a graph evaluation, and/or applying machine-executable compliance logic (regulation-as-code). The deterministic architecture may comply with legal constraints, for example, by avoiding or reducing risk of hallucinations, false information, and the like, which may occur by non-deterministic architectures. ML models may be used, for example, in anchor construction, confidence estimation, safeguards suggestions, and/or explanation drafting, but may be excluded from generating an indication of whether the data processing system complies with the privacy policy.

The reasoning engine may evaluate fingerprints against jurisdictional logic without identity.

The reasoning engine may apply regulatory logic stored in rule sets.

The reasoning engine may be designed to generate consistent compliance decisions without identity.

The reasoning engine may be referred to herein as a regulation-aware reasoning engine.

The deterministic reasoning engine may be implemented as a rules-based computational process designed to evaluate a privacy fingerprint against regulatory logic without requiring identity. For example, the following is an exemplary rule structure: IF fingerprint.legal_state.consent_state=VALID AND fingerprint.purpose.requires_consent=TRUE THEN ALLOW under CONSENT. The following is another exemplary rule structure: IF legal_state.consent_state="VALID" AND purpose.requires_consent=trueTHENdecision=ALLOWbasis=CONSENT.

The reasoning engine may determine compliance by evaluating one or more of: the privacy fingerprint(s), judicial rule sets, legal-state vectors, retention vectors, cross-border vectors, and/or contextual exceptions.

The reasoning engine may be implemented as an execution model, designed to perform one or more: deterministic evaluation, apply hierarchical rules, use jurisdiction-scoped logic, where no identity is required at any processing step.

The reasoning engine may be designed to evaluate the privacy fingerprint using one or more of: rule sets, law-mapping logic, jurisdictional constraints, exceptions, multi-vector fusion.

The reasoning engine may be designed to provide or significantly reduce risk of: no identity required at any processing step, perform a deterministic evaluation, and/or provide traceable legal reasoning.

The following is an exemplary process for processing the PF by the reasoning engine:

1. Load PF.
2. Identify applicable jurisdiction rules.
3. Evaluate PF.vectors against rule conditions.
4. Accumulate decision effects (allow/deny/review).
5. Select lawful basis (if any).
6. Generate explanation trace: vectors evaluated, rules triggered, conditions met.
7. Produce NICT token.

In some embodiments, compliance determinations are produced by deterministic rule evaluation of the regulatory anchor states (and/or fingerprints derived therefrom), and any AI/LLM component—if used—is limited to rendering, summarizing, or formatting an explanation trace and does not participate in or alter the compliance decision.

In some embodiments, for each detected data processing event the system generates an explanation trace as part of the non-identifying compliance/verification token (NICT). The explanation trace is produced from deterministic evaluation of the regulatory anchor set by the rule-based reasoning engine (e.g., rule identifiers triggered, anchor values evaluated, conditions satisfied, and decision outcome), and the compliance decision is not generated by a probabilistic language model. Any large language model (LLM), if used, is limited to a rendering layer that converts the deterministic trace into a human-readable natural-language narrative, without modifying the decision, rule set, or anchor evidence. In some embodiments, the NICT further includes integrity-protected audit trace and anchor-evidence fields and, in an audit mode, an encrypted event reference resolvable under audit privilege, as described herein.

The deterministic reasoning engine may compute the verification indication and optionally the explanation trace by the following exemplary process. Loading the regulatory anchor set into memory. Identifying applicable jurisdictional rules based on the jurisdiction anchor in the regulatory anchor set. Evaluating conditions of the jurisdictional rules against values encoded in the state anchors. Accumulating decision effects according to a rule hierarchy. Selecting at least one legal basis from candidate legal bases in the lawful basis anchor based on satisfaction of rule conditions. Generating the explanation trace including one or more of: identifiers of triggered rules, anchor values evaluated, conditions satisfied, and the selected legal basis.

An example of a structural implementation of the trace includes: trace=[{rule_id, jurisdiction, evaluated_fields, result, priority, parent_rule_id}].

At 216, a verification indication (e.g., decision of whether there is compliance with the privacy policy) may be generated by the reasoning engine.

The final verification indication (e.g., allow/deny/conditional) and optional legal basis selection are computed deterministically; ML outputs, if any, are treated as input signals with optional associated confidence and are not solely determinative.

The verification indication may be generated per monitored data processing event, using the regulatory anchor set computed for the data processing event. The PF may be treated as a derived artifact used for cross-event/aggregated context. Alternatively, the verification indication may be generated for a common data processing event associated with multiple monitored data processing events, optionally using the PF computed for the multiple monitored data processing events.

The verification indication (e.g., allowed/blocked/conditional) may be computed by: a rule engine/graph-based evaluation, regulation-as-code, deterministic evaluation of anchor states, and the like.

The verification indication may include a non-identifiable verification (i.e., compliance) token (NICT). The NICT may be generated by the reasoning engine. Alternatively, the NICT is computed by another process based on the verification indication generated by the reasoning engine.

Optionally, the NICT is generated per data processing event, regardless of whether convergence occurs. For multiple related data processing events, a single NICT may be computed for the multiple data processing events, or a respective NICT may be computed for each of the related data processing events.

Optionally, for each monitored data processing event, the system computes an event-level regulatory anchor set and generates an event-level NICT, regardless of whether convergence occurs.

In some embodiments, the non-identifying compliance token includes an encrypted or cryptographically protected reference to the underlying event, enabling authorized audit and verification without exposing personal data. Access to such references is restricted to audit mode and controlled by privilege and policy.

The compliance token may further include integrity protection, including digital signatures or message authentication codes, binding the token to the evaluated regulatory anchor state and decision outcome at a specific time. This enables verification of authenticity, integrity, and reproducibility of compliance determinations.

In some embodiments, each monitored data processing event independently results in anchor computation and generation of an event-level NICT, regardless of convergence and/or fingerprinting.

In some embodiments, the system supports an audit mode in which a non-identifying compliance/verification token (NICT) includes a cryptographically protected event reference (e.g., an encrypted event handle) that encodes a non-PII reference to an underlying event record and optionally a tenant identifier and timestamp. In such embodiments, decryption and/or resolution of the protected event reference is restricted to audit privileges (e.g., role-based or attribute-based access control), such that authorized audit users and/or audit processes may retrieve the referenced event record, while non-audit users cannot. In some embodiments, token integrity is ensured by attaching a cryptographic signature and/or message authentication code (HMAC) computed over at least the decision fields, anchor evidence and/or explanation trace identifiers, and the protected event reference, thereby enabling detection of tampering and replay.

The NICT may include a legal conclusion, and optionally an explanation trace.

The NICT is designed to exclude any identification of a person.

The NICT may be designed to be logged, audited, exported, and/or shared.

The NICT may be implemented as a machine-readable data structure, such as for machine-readable compliance determination.

The NICT may be implemented as a publicly safe, non-identifiable token.

The NICT may represent the result of legal reasoning without retaining and/or accessing personal information. The NICT may represent one or more of: a decision, a legal basis, required safeguards, and/or explanation.

The NICT is designed to exclude personal data.

The NICT is designed such that it cannot be linked to an individual.

The NICT may include one or more of: compliance decision, lawful basis, rule trace, required mitigations, and/or regulatory context.

An exemplary NICT is as follows:

{"nict_id": "token_a92b . . . ", "allowed": true, "legal basis": "CONSENT", "decision_code": "GDPR_ALLOW", "explanation": {"summary": "Valid consent under Art.6(1)(a)", "rules_applied": ["GDPR_DE.CONSENT_REQUIRED" ]}}

Another exemplary NICT is as follows:

{"nict_id": "token_a81f3 . . . ", "allowed":true, "legal basis": "CONSENT", "decision_code": "GDPR_ALLOW", "explanation": {"summary": "Allowed: valid consent present under GDPR Art.6(1)(a)", "rules_applied": ["GDPR_DE.CONSENT_REQUIRED" ], "vector_evidence": ["legal_state.consent_state=VALID" ]}, "timestamp": "2025-11-18T12:41:10Z" }

The verification indication and optionally the explanation trace are computed by the reasoning engine without using data identifiable with at least one specific identity. The non-identifiable verification (i.e., compliance) token (NICT) optionally including the verification indication and/or the explanation trace are computed without using data identifiable with at least one specific identity. The NICT excludes data identifiable with at least one specific identity.

All stored NICT are safe to disclose because none include identity information. (non-identifying)

Optionally, multiple NICT tokens are computed for multiple data processing events. The NICT tokens may be stored in a database. An interface (e.g., GUI) designed for executing a query on the NICT tokens may be selected. The query interface may be provided, for example, to one or more of: regulators, auditors, DPO compliance reports.

Examples of queries that may be executed on the database via the user interface include:

- Consent drift: identifying NICTs where consent state is expired and operation is export. For example, "Find all tokens where consent_state=expired AND action type=export."
- Retention violations: identifying NICTs where retention has expired but processing continued. For example, "List tokens where retention_state indicates expired but processing continued."
- Mass processing detection: aggregating NICTs by risk score exceeding a threshold. For example, "Aggregate tokens with volume_anomaly_score>threshold per system per day."
- Cross-system convergence: identifying convergence clusters spanning multiple systems, and identifying NICTs where required safeguards are missing. For example, "Show convergence clusters with confidence >0.85 spanning ≥3 systems."
- Safeguards compliance. For example, "Find tokens where risk_state is high and safeguards_state is missing encryption/DLP."

Optionally, an audit and/or explanation layer is automatically implemented. The audit and/or explanation layer may be designed to perform one or more of: persist NICT tokens (non-identifying) and/or persist rule traces (non-identifying).

In some embodiments, the system supports an audit mode in which a non-identifying compliance/verification token (NICT) is generated as an audit-grade token that is integrity-protected and includes a protected reference to a source event record without including personal data. In audit mode, the NICT may include an encrypted event reference (also referred to herein as an encrypted event handle) that encodes a non-PII event identifier (e.g., a connector-issued event sequence number, internal event GUID, or event log offset) and optionally a tenant identifier and timestamp, where the event reference is encrypted (e.g., using symmetric encryption) and is non-human-readable. Access to decrypt and/or resolve the encrypted event reference is restricted to an audit privilege and enforced by access control (e.g., role-based access control, attribute-based access control, and/or hardware-backed key access), such that authorized audit users and/or audit processes can retrieve the referenced event record for validation, while non-audit users cannot. In some embodiments, token integrity is ensured by attaching a cryptographic signature or message authentication code (HMAC) computed over at least the decision fields, explanation trace identifiers, and the encrypted event reference, optionally including a timestamp and/or expiration, thereby enabling detection of tampering and replay and providing non-repudiation of the compliance determination.

In some embodiments, the non-identifying compliance/verification token (NICT) is generated as an integrity-protected, audit-grade artifact. Integrity protection may be implemented by computing and attaching a cryptographic signature and/or message authentication code (HMAC) over at least a canonical representation of the decision fields and supporting evidence. In some embodiments, prior to signing and/or HMAC computation, the system performs canonicalization of anchor state (and/or privacy fingerprint state), for example by serializing anchor/state values in a deterministic format (e.g., stable field ordering, normalized encodings, and normalized timestamps) so that a verifier can recompute the signature/HMAC consistently and detect tampering. In some embodiments, the NICT further includes, in an audit mode, an encrypted event reference (encrypted event handle) that encodes a non-PII reference to an underlying event record (e.g., internal event GUID, connector-issued sequence number, or log offset) and optionally a tenant identifier and timestamp, where decryption and resolution of the encrypted event reference is permitted under audit privilege. In some embodiments, cryptographic keys used for signing, HMAC, and/or event-reference encryption are managed by a key management service (KMS) (e.g., cloud KMS or hardware security module), optionally with key rotation, access policies, and per-tenant key separation.

At 218, one or more automated actions may be implemented in response to the NICT indicating a breach of the privacy policy.

The NICT may be used to gate execution of a computing operation (e.g., export/sync/job), thereby changing operation of the data processing system in real time.

Optionally, the automated actions include transmitting instructions for blocking and/or temporarily pausing execution of the data processing event to the data processing system. Alternatively or additionally, the automated actions include transmitting instructions for ensuring implementations of specific safeguards encoded in the NICT before resuming execution of the data processing event.

Optionally, logs are generated. The logs may include one or more of: PF ID, NICT ID, rules applied, and decision. The logs may exclude: email, phone number name and/or other user identifiers, and/or raw logs from the data processing systems.

At 220, one or more features described with reference to 202-218 are iterated. The iterations may be performed for computing NICT tokens for data processing events occurring in different data processing systems. The NICT tokens may trigger automated actions and/or may be incrementally added to the database.

Additional exemplary technical implementations (e.g., of the system described with reference to FIG. 1) are now described.

Optionally, one or more APIs (e.g., API layers) are implemented. For example:

A decision API is designed to receive the context signals (i.e., metadata) and return the NICT.

An ontology API is designed for updating one or more of: jurisdictional logic, purpose definitions, retention rules, and/or risk models.

A rule engine admin API may manage one or more of: rule sets, regulatory updates, and/or versioned logic.

Fingerprints may be stored in a data storage device and/or database designed to store PFs excluding other data and/or excluding identifying data. The database may include an index, for example, by PF_ID, purpose, and/or jurisdiction.

The NICT may be stored in a data storage device and/or database designed to store NICTs and/or explanations.

The system may be designed to ensure or significantly reduce one or more of:

1. No personal data ever enters any core process.
2. Tokens, PFs, logs, states, and/or reasoning are non-identifying.
3. Reverse mapping to obtain personal information.
4. Context-only reasoning is applied.
5. All processing is performed using abstracted vectors.
6. Legal-state, retention-state, and/or risk-state vectors form the core computational state.
7. Compliance determination is identity-free.

The following represent exemplary performance requirements (e.g., of the system described with reference to FIG. 1).

Decision latency: ≤about 40-100 milliseconds (ms)

Throughput: about 1000-1500 decisions/sec per instance

Fingerprint generation: ≤about 8-15 ms

Rule evaluation: ≤about 3-10 ms

Availability: about 99.9-99.9%

PII tolerance: absolute, or at least about 98%, or 99%, or other value.

The following are exemplary technical features for implementation in the system described herein:

Anchor Management:

CRUD endpoints for anchor_types, anchors, and anchor_mappings.

Versioning (increment version when an ANCHOR is changed).

Ability to DEPRECATE anchors without breaking old fingerprints.

Dimension-Aware Storage

All fields should be clearly grouped by dimension in code and schema (e.g., legal, context, risk_and_technical sections in domain model).

Anchor Resolution Service—Given a Context Signal, Determine the Best Anchor_Id:

Pattern matching by jurisdiction and purpose.

Filtering by source system and event type.

Using priority ordering if multiple matches exist.

Fingerprint Assembly Service

Combine ANCHOR+Context Signal into a fully-formed Privacy Fingerprint object.

Ensure no personal data is included.

Validate completeness of Legal, Contextual, and Risk dimensions.

Multi-tenant Support

Anchors can be global or tenant-specific.

Anchor mappings are typically tenant-specific.

Other exemplary features of the systems include:

Performance: Anchor resolution+fingerprint assembly should be ≤10 ms per request under normal load.

Scalability: Support thousands of anchors and mappings per tenant. Efficient indexing on tenant_id, source_system, event type, jurisdiction.

Security and Privacy: PII validation: no anchors or mappings may contain personal data. Apply regex/filtering for emails, phone patterns, UUID-like tokens in free-text fields.

Auditability: Every create/update of anchors and mappings must be logged (who, what, when, old vs new).

Availability: ANCHOR service is on the critical path→SLA 99.9%.

Referring now back to FIG. 3, the dataflow diagram may correspond to, and/or be implemented, by one or more features described herein, for example, with reference to FIG. 1 and/or FIG. 2.

FIG. 3 is provided as a functional dataflow illustration. For clarity, in some embodiments the stage labeled "privacy fingerprint engine" at 310 is implemented as an Anchor & Fingerprint Engine, because the primary function at that stage is generation of per-event regulatory anchor sets (state anchors) from validated and normalized contextual multi-signals, and privacy fingerprint generation is optional and performed as a derived aggregation artifact when convergence is detected, as described herein. Further, the "audit/explanation" stage at 316 is, in some embodiments, implemented as Anchor-Based Legal Explanation, in which audit artifacts and explanation traces are derived from the deterministic, rule-based evaluation of anchor states (and/or fingerprints derived from anchor states), including rule identifiers and anchor evidence, and are included in and/or referenced by the NICT in a non-identifying manner. Accordingly, FIG. 3 should be understood as depicting anchor-based compliance determination with optional fingerprint aggregation, rather than requiring fingerprinting for every event.

For clarity, in some embodiments stages 306-314 operate in a per-event manner: each validated context signal results in computation of an event-level regulatory anchor set and generation of a per-event NICT at stage 314. The functionality depicted at stage 310 includes anchor computation for every event and, when convergence is satisfied, optional generation of a privacy fingerprint as an aggregated artifact. Thus, the system issues per-event tokens irrespective of whether any fingerprint is created, and fingerprints are generated for converged multi-event context.

At 302, one or more external source systems, are monitored, for example, CRM, marketing, analytics, HR, and the like.

At 304, contextual multi-signal input is extracted from the external source systems.

At 306, the contextual multi-signal input is fed into a signal validation layer. The signal validation layer may perform, for example, PII blocking and/or schema enforcement.

At 308, contextual normalization may be performed.

At 310, a privacy fingerprint engine may perform context fusion and/or generate legal-state vectors.

At 312, a regulation-aware reasoning engine is implemented.

At 314, a compliance decision process generates a non-identifying token.

At 316, an audit may be performed and/or an explanation may be provided.

Various embodiments and aspects of the present invention as delineated hereinabove and as claimed in the claims section below find support in the following examples.

EXAMPLES

Reference is now made to the following examples, which together with the above descriptions illustrate some embodiments of the invention in a not necessarily limiting fashion.

Each example described herein includes the computation of an event-level regulatory anchor set and the generation of a corresponding event-level non-identifying compliance token (NICT), even where multiple events are later determined to form part of a common processing context.

Example 1: EU Newsletter Email Send (Single-System; Per-Event PF and NICT)

Bootstrap (feature 202): A connector is installed in a marketing CRM system. During onboarding, the server receives schema-only information for marketing objects (e.g., "CampaignMember," "Contact," "EmailSendJob") without receiving personal data. The server infers data categories including CONTACT_DATA and BEHAVIORAL_EVENT and generates a monitoring plan that selects monitored event types including SEND_EMAIL and EXPORT_CONTACTS. The plan includes a schema allowlist for contextual metadata fields and a denylist of PII patterns.

Monitoring (feature 204): The connector monitors for an event type matching SEND_EMAIL initiated by the CRM's email job processor.

Contextual metadata extraction (feature 206): Upon detecting SEND EMAIL, the connector extracts candidate contextual metadata, for example: {tenant_id: "tenant_123", source_system: "crm_marketing", event_type: "SEND_EMAIL", jurisdiction: "EU_DE", purpose_code: "MARKETING_NEWSLETTER", data_categories: ["CONTACT_DATA", "BEHAVIORAL_EVENT" ], processing mode: "SEND", consent_state: "VALID", destination_class: "third_party_email_vendor", timestamp: "2025-11-18T12:41:02Z", volume_bucket: "1 k-10 k" } The connector does not extract or transmit email addresses, user IDs, message bodies, or recipient lists.

Pre-processing/filtering (feature 208): The connector (or server) applies schema enforcement and PII detection. If any field matches an email, phone, IP address, cookie ID, device ID, or hashed identifier pattern, the request is rejected or the field is removed based on policy. The filtered contextual metadata is forwarded.

Regulatory anchor set computation (feature 210): The server computes a regulatory anchor set for the event including, for example:

purpose anchor (purpose band MARKETING; confidence high; drift low), jurisdiction anchor (EU DE), lawful basis anchor (candidate basis CONSENT; consent_ state VALID), transfer boundary anchor (to third party; not cross-border or unknown depending on destination), retention anchor (policy RET_MARKETING_24M; not expired), risk/safeguards anchor (risk score computed from categories+transfer boundary; safeguards include unsubscribe link, opt-out enforcement, logging).

In some embodiments, the server resolves the applicable multi-dimensional anchor template using anchor mappings and instantiates it with context-specific values to populate the anchor set.

Privacy fingerprint computation (feature 212): A per-event PF is assembled from the anchor set and context signal overrides, for example: {pf_id: "fp_12345", purpose: {code: "MARKETING_NEWSLETTER",requires_consent:true}, legal_state: {candidate_bases: ["CONSENT" ], consent_state: "VALID", jurisdiction: "EU_DE" }, retention_state: {policy_code: "RET_MARKETING_24M", expires_at: "2027-11-18T00:00:00Z" }, risk state: {risk_score: 0.32, risk_factors: ["EMAIL_MARKETING", "THIRD_PARTY_VENDOR" ], required_safeguards: ["INCLUDE_UNSUBSCRIBE_LINK", "RESPECT_OPT_OUT_FLAGS", "AUDIT_LOGGING" ]}, technical_context: {system_origin: "crm marketing", processing_action: "SEND_EMAIL", execution_mode: "batch_job" }}

Reasoning engine evaluation (feature 214): The deterministic reasoning engine loads the PF, selects GDPR rules for EU_DE, evaluates consent validity and required safeguards, and produces a decision and trace.

Verification indication/NICT (feature 216): An exemplary NICT is generated: {nict_id: "token_a81f3", allowed:true, legal_basis: "CONSENT", decision_code: "GDPR_DE_ALLOW_MARKETING_EMAIL", conditions: ["INCLUDE_UNSUBSCRIBE_LINK", "RESPECT_OPT_OUT FLAGS", "AUDIT_LOGGING" ], explanation: {rules applied: ["GDPR_DE.CONSENT_REQUIRED", "GDPR_COMMON.MARKETING_EMAIL_SAFEGUARDS" ], vector_evidence: ["legal_state.consent_state=VALID", "purpose.requires_consent=true", "transfer_boundary.third_party=true" ]}}

Automated action (feature 218): Because allowed=true, the connector permits completion of the SEND_EMAIL job. If conditions are unmet (e.g., unsubscribe link missing), the decision may be CONDITIONAL and the connector may pause execution until safeguards are enabled.

Iteration (feature 220): NICTs are persisted and made queryable for audits without storing personal data.

Example 2: Cross-System Convergence for a Third-Party Data Export (CRM+Data Warehouse+Integration Service)

Bootstrap (feature 202): Connectors are installed in: (i) CRM, (ii) data warehouse, and (iii) integration service. The server generates monitoring plans for each, focusing on bulk read/export/sync events and transfers to third parties.

Monitoring (feature 204): Within a short time window, three events occur:

1. CRM: "EXPORT_CONTACTS" (report export job started)
2. Data warehouse: "BULK_READ_CUSTOMERS" (query job reading customer table at high volume)
3. Integration service: "SYNC_TO_VENDOR_X" (outbound sync to a vendor endpoint)

Contextual metadata extraction (act 206): Each connector extracts candidate contextual metadata. Examples (non-limiting):

CRM event context: {source_system: "crm_core", event type: "EXPORT_CONTACTS", purpose_code: "MARKETING_EXPORT", jurisdiction: "EU_IE", data_categories: ["CONTACT_DATA" ], processing_mode: "export", destination_class: "integration_service", timestamp: "2026-01-10T10:00:10Z", volume_bucket: "10 k-100 k" }

Warehouse event context: {source_system: "dw", event type: "BULK_READ_CUSTOMERS", purpose_code: "MARKETING_EXPORT", jurisdiction: "EU_IE", data_categories: ["CONTACT_DATA" ], processing_mode: "query", execution_mode: "batch_job", timestamp: "2026-01-10T10:00:25Z", volume_bucket: "10 k-100 k" }

Integration event context: {source_system: "integration_hub", event_type: "SYNC_TO_VENDOR_X", purpose_code: "MARKETING_EXPORT", jurisdiction: "EU_IE", data_categories: ["CONTACT_DATA" ], processing mode: "sync", destination_class: "third_party", cross_border_boolean:true, destination_geo: "US", timestamp: "2026-01-10T10:01:05Z" }

Pre-processing/filtering (feature 208): Each connector enforces schema and blocks identifiers. For example, if the integration service attempted to include vendor-specific user keys or hashed emails in metadata, the validation layer rejects the request or removes fields according to policy.

Regulatory anchor set computation (feature 210): For each event, the server computes an event-level regulatory anchor set including jurisdiction, transfer boundary, lawful basis candidates, retention state, and risk/safeguards.

Privacy fingerprint and convergence (feature 212): The convergence engine computes a convergence confidence score, for example:

anchor similarity: high (same jurisdiction, purpose band, data category, and overlapping processing actions export/query/sync), temporal alignment: high (within two minutes), cross-system reliability coefficient: high (trusted connectors; complete signals).

Upon exceeding threshold, the engine merges the anchor sets into a single PF representing the unified export activity, for example: {pf id: "pf export 8891", legal_state: {candidate_bases: ["CONSENT", "LEGITIMATE_INTEREST" ], consent_state: "UNKNOWN", jurisdiction: "EU_IE", constraints: ["NO_EXPORT_IF_CONSENT_REQUIRED_AND_UNKNOWN" ]}, retention_state: {policy_code: "RET_MARKETING_24M", expires_at: "2027-01-10T00:00:00Z" }, risk_state: {risk_score: 0.78, risk_factors: ["THIRD_PARTY_TRANSFER", "CROSS_BORDER", "BULK_VOLUME" ], required_safeguards: ["SCC_OR_EQUIVALENT", "DLP_SCAN", "AUDIT_LOGGING", "ACCE SS_CONTROL" ]}, technical_context: {systems_involved: ["crm_core", "dw", "integration_hub" ], processing_actions: ["EXPORT_CONTACTS", "BULK_READ_CUSTOMERS", "SYNC_TO_VENDOR_X" ], destination_geo: "US" }}

Reasoning engine evaluation (feature 214): The rules engine selects EU_IE rules, detects cross-border transfer to US, and evaluates whether safeguards (e.g., SCCs) are required and whether consent is required/available for marketing export.

Verification indication/NICT (feature 216): An exemplary NICT may be conditional or blocking, e.g.: {nict_id: "token_cb12", allowed:false, legal_basis:null, decision_code: "GDPR_IE_BLOCK_CROSS_BORDER_EXPORT", explanation: {rules_applied: ["GDPR_IE.CROSS_BORDER_REQUIRES_SCC", "GDPR_IE.MA RKETING_EXPORT_CONSENT_REQUIRED" ], vector_evidence: ["risk_state.risk_factors include CROSS_BORDER", "legal_state.consent_state=UNKNOWN" ]}}

Automated action (feature 218): The server transmits instructions to at least the integration connector to block the SYNC_TO_VENDOR_X event and/or pause it pending safeguards (e.g., SCC evidence token, DLP scan completion, approval).

Iteration (feature 220): The NICT and trace are stored for audit queries such as "find all cross-border marketing exports blocked for missing safeguards," without storing any personal data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant data processing systems will be developed and the scope of the term data processing system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of automated verification of a privacy policy, comprising:

monitoring a data processing system for a data processing event;

extracting candidate contextual metadata associated with the data processing event, filtering the candidate contextual metadata to reject fields matching patterns correlated with identifiable data, including: email address, phone number, name, device identifier, cookies, pseudonym, network addresses, and hashed identifiers, for generating contextual metadata excluding data identifiable with at least one specific identity;

dynamically computing, by at least one of a connector executing within the data processing system and a server, a regulatory anchor set for the data processing event based on the contextual metadata, the regulatory anchor set comprising a plurality of state anchors indicating a dynamic state computed based on current operation and/or current context;

feeding the regulatory anchor set into a deterministic reasoning engine configured for verification of the privacy policy by applying jurisdictional rules;

computing, by the reasoning engine, a verification indication and an explanation trace without using data identifiable with at least one specific identity;

generating a non-identifiable verification token (NICT) including the verification indication and the explanation trace, wherein the NICT excludes data identifiable with at least one specific identity; and in response to the NICT indicating a breach of the privacy policy, transmitting to the data processing system instructions for blocking execution of the data processing event.

2. The computer implemented method of claim 1, further comprising, in response to the NICT indicating conditional execution, transmitting to the data processing system instructions for temporarily pausing execution of the data processing event, and ensuring implementations of specific safeguards encoded in the NICT before resuming execution of the data processing event.

3. The computer implemented method of claim 1, wherein a plurality of NICTs are computed for a plurality of data processing events, and further comprising:

storing the plurality of NICTs in a database; and providing an interface for executing a query on the plurality of NICTs, wherein the query is selected from: identifying NICTs where consent state is expired and operation is export, identifying NICTs where retention has expired but processing continued, aggregating NICTs by risk score exceeding a threshold, identifying convergence clusters spanning multiple systems, and identifying NICTs where required safeguards are missing.

4. The computer implemented method of claim 1, wherein the regulatory anchor set and/or NICT are non-identifying of a specific personal identity, not derived from attributes of the specific personal identify, non-reversible for identification of the specific personal identity, and cannot be used to reconstruct personal data, identity information, and/or person-related entities.

5. The computer implemented method of claim 1, further comprising:

detecting, by a convergence engine, a plurality of related data processing events from a plurality of different data processing systems based on contextual similarity;

computing a respective regulatory anchor set for each data processing event to generate a plurality of regulatory anchor sets, computing a convergence confidence score based on at least one or combination of:

an anchor similarity score comparing anchor sets of the plurality of related events, a temporal alignment score measuring temporal proximity, and a cross-system reliability coefficient;

in response to the convergence confidence score exceeding a threshold, generating a privacy fingerprint data structure by: merging the plurality of regulatory anchor sets from the plurality of related events, and structuring the merged plurality of regulatory anchor sets into at least one privacy fingerprint encoding verification data, wherein the privacy fingerprint excludes personal data and personal identifiers; and wherein feeding the regulatory anchor set into the deterministic reasoning engine comprises feeding the privacy fingerprint into the deterministic reasoning engine.

6. The computer implemented method of claim 5, wherein:

the monitoring and the filtering are implemented by a respective connector locally installed in each of the plurality of different data processing systems, the contextual metadata is extracted by the respective connector from each corresponding data processing system and sent to the server, the server generates the plurality of regulatory anchor sets and generates the privacy fingerprint, and operates the deterministic reasoning engine.

7. The computer implemented method of claim 5, wherein the privacy fingerprint data structure comprises at least one of:

a legal-state vector encoding at least one of: at least one candidate legal basis, a consent state indicator, a jurisdiction identifier, and a list of regulatory constraints;

a retention-state vector encoding at least one of: a retention policy code and an expiration timestamp;

a risk-state vector encoding: a risk score, a list of risk factors, and a list of required safeguards;

a technical-context vector encoding at least one of: a system origin identifier, a processing action code, and a list of systems involved in the convergence; and a jurisdictional-context vector encoding: at least one applicable jurisdiction.

8. The computer implemented method of claim 1, wherein the state anchors are selected from:

a purpose anchor encoding a purpose vector, an operation anchor encoding a canonical operation code, a sensitivity anchor encoding an event sensitivity score, a transfer boundary anchor indicating whether the event crosses a boundary, a jurisdiction anchor indicating a jurisdiction, a lawful basis anchor indicating lawful basis candidates, a retention anchor and/or expiration anchor indicating whether retention is expired, a risk and/or safeguards anchor indicating a risk score, a behavioral pattern and/or anomaly anchor indicating anomalous patterns, a convergence confidence anchor indicating a common processing context, a legal explanation and/or decision trace anchor indicating deterministic decision trace, a provenance evidence chain anchor indicating provenance, a technical context and/or execution environment anchor encoding execution context, and an adaptive monitoring and/or feedback state anchor implementing closed-loop monitoring.

9. The computer implemented method of claim 8, wherein the purpose anchor is computed by:

extracting a feature vector from the contextual metadata;

applying a multi-signal purpose classifier to generate a purpose probability distribution over a plurality of canonical purpose classes;

selecting a purpose band based on the purpose probability distribution;

computing a confidence score based on a maximum probability value and a quality coefficient derived from signal completeness; and computing a purpose drift measure by calculating a divergence between the purpose probability distribution and a baseline purpose distribution for similar events.

10. The computer implemented method of claim 8, wherein the lawful-basis anchor encodes:

a lawful basis selected from: consent, contract, legal obligation, vital interests, public task, and legitimate interest;

a consent state selected from: valid, expired, missing, withdrawn, not required, and unknown; and a list of constraint codes specifying conditions that must be satisfied for the data processing event to comply with the privacy policy.

11. The computer implemented method of claim 8, wherein the retention anchor encodes:

an allowed time-to-live value;

an age value representing time elapsed since data creation;

an expiration Boolean indicating whether retention has expired;

a retention band selected from: active, near expiry, expired, and unknown; and a deletion capability classification indicating whether the data processing system supports automated deletion.

12. The method of claim 8, wherein the regulatory anchor set further comprises at least one of:

a transfer boundary anchor encoding at least one of: a boundary classification selected from: internal, internal extract-transform-load (ETL), to third party, cross-border, and unknown; a third-party Boolean; a cross-border Boolean; a destination class; and a geographic destination identifier;

a jurisdiction anchor encoding at least one of: a primary jurisdiction identifier, at least one secondary jurisdiction identifier, a controller locus identifier, and a subject locus identifier; and a technical context anchor encoding at least one of: an execution mode selected from: application programming interface (API) call, batch job, export job, sync task, and ETL pipeline; a data flow direction selected from: inbound, outbound, and internal; and an integration type selected from: native, custom API, software as a service (SaaS), and file export.

13. The method of claim 8, wherein the operation anchor is computed by:

extracting operation signals from the contextual metadata including at least one of: application programming interface (API) endpoint patterns, database operation types, job scheduler metadata, and network flow direction;

applying a multi-signal operation classifier to generate an operation probability distribution over canonical operation codes;

selecting a canonical operation code from: read, query, write, update, delete, export, share, and sync; and computing an operation confidence score and an operation drift measure.

14. The computer implemented method of claim 8, wherein the deterministic reasoning engine computes the verification indication and the explanation trace by:

loading the regulatory anchor set into memory;

identifying applicable jurisdictional rules based on the jurisdiction anchor in the regulatory anchor set;

evaluating conditions of the jurisdictional rules against values encoded in the state anchors;

accumulating decision effects according to a rule hierarchy;

selecting at least one legal basis from candidate legal bases in the lawful basis anchor based on satisfaction of rule conditions; and generating the explanation trace comprising: identifiers of triggered rules, anchor values evaluated, conditions satisfied, and the selected legal basis.

15. The computer implemented method of claim 8, wherein the risk anchor is computed by:

computing a sensitivity score based on a category exposure multiplier derived from data categories in the contextual metadata, and a volume escalation effect derived from processing volume metrics;

determining a transfer boundary classification indicating whether the data processing event crosses at least one of: an internal boundary, a third-party boundary, and a cross-border boundary;

applying a risk model to the sensitivity score and the transfer boundary classification to generate the risk score; and determining required safeguards based on the risk score and jurisdictional requirements.

16. The computer implemented method of claim 1, wherein the data processing system comprises a plurality of heterogeneous data processing system, and further comprising:

mapping different fields of the plurality of heterogeneous data processing system to canonical verification-context signals for performing semantic normalization of multi-source contextual data, wherein the regulatory anchor set is computed based on the canonical verification context-signals.

17. The computer implemented method of claim 1, further comprising: during a bootstrap phase, performing system profiling by:

receiving, from a connector monitoring the data processing system, schema data describing data objects in the data processing system without receiving personal data, applying a machine learning (ML) model to the schema data to infer data categories and sensitivity classifications, and generating a monitoring plan specifying which events to monitor and which anchors to compute; and transmitting the monitoring plan to the connector for implementation.

18. The computer implemented method of claim 17, further comprising: computing a behavioral anomaly anchor by:

calculating at least one of: a rate anomaly score, a burst anomaly score, and a temporal coherence score from aggregate telemetry data, computing an anomaly score from the calculated scores, and when the anomaly score exceeds a threshold, updating the monitoring plan to increase at least one of: sampling rate, evidence collection level, and enabled optional anchors; and transmitting the updated monitoring plan to the connector.

19. The computer implemented method of claim 1, further comprising:

anchoring a multi-dimensional anchor template to the data processing event, wherein the multi-dimensional anchor template includes at least one of:

(i) a legal dimension indicating jurisdictional requirements, consent requirements, candidate legal bases, and retention policies, (ii) a contextual dimension including at least one of purpose codes, processing actions, and data categories, (iii) a risk dimension indicating base risk scores, risk factors and technical constraints, selecting a type of the multi-dimensional anchor template from a plurality of multi-dimensional anchor templates of different types based on template selection criteria applied to the contextual metadata; and computing the regulatory anchor set by instantiating the selected multi-dimensional anchor template with values from the contextual metadata.

20. The computer implemented method of claim 19, further comprising:

storing the plurality of multi-dimensional anchor templates in an anchor repository, wherein each multi-dimensional anchor template is versioned and associated with at least one of:

an anchor type identifier, a jurisdiction pattern, a purpose code pattern, and a data category pattern; and resolving the selected multi-dimensional anchor template by:

matching the contextual metadata against the jurisdiction pattern, purpose code pattern, and data category pattern of each anchor template, and selecting the multi-dimensional anchor template with highest priority among matching templates.

21. A system for automated verification of a privacy policy, comprising;

a plurality of connectors, each connector configured for installation in a data processing system of a plurality of data processing systems and for monitoring the data processing system for a data processing event;

extracting non-identifying contextual metadata associated with the data processing event, extracting candidate contextual metadata associated with the data processing event, wherein the candidate contextual metadata excludes data identifiable with at least one specific identity;

processing the candidate contextual metadata against a predefined schema to reject fields matching patterns correlated with identifiable data, including: email address, phone number, name, device identifier, cookies, pseudonym, network addresses, and hashed identifiers, for generating contextual metadata excluding data identifiable with at least one specific identity; and transmitting the contextual metadata over a network to a server;

at least one processor of the server in network communication with the plurality of connectors, the at least one processor executing a code for:

dynamically computing a regulatory anchor set for the data processing event based on the contextual metadata, the regulatory anchor set comprising a plurality of state anchors indicating a dynamic state computed based on current operation and/or current context;

feeding the regulatory anchor set into a deterministic reasoning engine configured for verification of the privacy policy by applying jurisdictional rules;

computing a verification indication and an explanation trace by the reasoning engine without using data identifiable with at least one specific identity; and generating a non-identifiable verification token (NICT) including the verification indication and the explanation trace, wherein the NICT excludes data identifiable with at least one specific identity; and in response to the NICT indicating a breach of the privacy policy, transmitting to the data processing system instructions for blocking execution of the data processing event.

22. A non-transitory medium storing program instructions for automated verification of a privacy policy, which when executed by at least one processor, cause the at least one processor to:

extract candidate contextual metadata associated with the data processing event, filter the candidate contextual metadata to reject fields matching patterns correlated with identifiable data, including: email address, phone number, name, device identifier, cookies, pseudonym, network addresses, and hashed identifiers, for generating contextual metadata excluding data identifiable with at least one specific identity;

dynamically compute, by at least one of a connector executing within the data processing system and a server, a regulatory anchor set for the data processing event based on the contextual metadata, the regulatory anchor set comprising a plurality of state anchors indicating a dynamic state computed based on current operation and/or current context;

feed the regulatory anchor set into a deterministic reasoning engine configured for verification of the privacy policy by applying jurisdictional rules;

compute, by the reasoning engine, a verification indication and an explanation trace without using data identifiable with at least one specific identity; and generate a non-identifiable verification token (NICT) including the verification indication and the explanation trace, wherein the NICT excludes data identifiable with at least one specific identity; and in response to the NICT indicating a breach of the privacy policy, transmit to the data processing system instructions for blocking execution of the data processing event.

* * * * *